(12) United States Patent
Hisano et al.

(10) Patent No.: US 12,234,102 B2
(45) Date of Patent: Feb. 25, 2025

(54) RUBBER PLUG SUPPLY APPARATUS

(71) Applicant: Shinmaywa Industries, Ltd., Takarazuka (JP)

(72) Inventors: Masaru Hisano, Takarazuka (JP); Kenji Yamakawa, Takarazuka (JP)

(73) Assignee: Shinmaywa Industries, Ltd., Hyogo (JP)

( * ) Notice: Subject to any disclaimer, the term of this patent is extended or adjusted under 35 U.S.C. 154(b) by 90 days.

(21) Appl. No.: 18/028,236

(22) PCT Filed: Sep. 16, 2021

(86) PCT No.: PCT/JP2021/034134
§ 371 (c)(1),
(2) Date: Mar. 24, 2023

(87) PCT Pub. No.: WO2022/070957
PCT Pub. Date: Apr. 7, 2022

(65) Prior Publication Data
US 2023/0373731 A1   Nov. 23, 2023

(30) Foreign Application Priority Data

Sep. 29, 2020   (JP) ................................ 2020-163627

(51) Int. Cl.
*B65G 47/14* (2006.01)
*B65G 47/24* (2006.01)
*B65G 47/248* (2006.01)

(52) U.S. Cl.
CPC .......... *B65G 47/14* (2013.01); *B65G 47/248* (2013.01); *B65G 47/24* (2013.01)

(58) Field of Classification Search
CPC ...... B65G 47/14; B65G 47/248; B65G 47/24; B65G 2203/042

(Continued)

(56) References Cited

U.S. PATENT DOCUMENTS 5,421,447 A * 6/1995 Ruth .................... B65G 47/915
198/395
6,386,433 B1 * 5/2002 Razon .................. B23K 3/0623
228/13

(Continued)

FOREIGN PATENT DOCUMENTS

JP   2005-060023 A   3/2005
JP   2009-173448 A   8/2009

(Continued)

OTHER PUBLICATIONS

Official Communication issued in International Patent Application No. PCT/JP2021/034134, mailed on Nov. 30, 2021.

*Primary Examiner* — James R Bidwell
(74) *Attorney, Agent, or Firm* — Keating & Bennett, LLP

(57) ABSTRACT

A rubber plug supply apparatus 10 according to the present invention includes a supply device 20, a sensor 32, an orientation correction device 40, and an accommodation assistance device 107. The supply device 20 includes an accommodation portion 21 accommodating a rubber plug 5 and a discharge port 22b, from which the rubber plug 5 is discharged. The sensor 32 detects the orientation of the rubber plug 5 supplied by the supply device 20. The orientation correction device 40 includes an accommodation hole 51 accommodating the rubber plug 5, and changes the orientation of the rubber plug 5 to a predetermined orientation in the case where the orientation of the rubber plug 5 detected by the sensor 32 is different from the predetermined orientation. The accommodation assistance device 107 moves one of, or both of, the accommodation hole 51 and the discharge port 22b to move the position of the accommodation hole 51 with respect to the discharge port 22b at least between a first position P1 directly facing the discharge (Continued)

port 22*b* and a second position P2 shifted from the first position P1 and facing a part of the discharge port 22*b*.

19 Claims, 18 Drawing Sheets

(58) Field of Classification Search
USPC .................................................. 198/395, 396
See application file for complete search history.

(56) References Cited

U.S. PATENT DOCUMENTS

| | | | |
|---|---|---|---|
| 6,398,007 B1 * | 6/2002 | Yamada | B65G 47/256 |
| | | | 406/87 |
| 7,861,889 B2 * | 1/2011 | Ishigure | B65G 47/145 |
| | | | 221/168 |
| 2006/0196153 A1 | 9/2006 | Ishigure | |

FOREIGN PATENT DOCUMENTS

| | | | |
|---|---|---|---|
| JP | 2015-167079 A | 9/2015 | |
| KR | 10-2018-0096540 A | 8/2018 | |
| WO | 2005/003002 A1 | 1/2005 | |
| WO | 2015/119051 A1 | 8/2015 | |
| WO | 2021/029177 A1 | 2/2021 | |
| WO | WO-2021029176 A1 * | 2/2021 | ............. B65G 47/14 |

* cited by examiner

RUBBER PLUG SUPPLY APPARATUS

TECHNICAL FIELD

The present invention relates to a rubber plug supply apparatus.

BACKGROUND ART

Conventionally, a water-proof rubber plug attachable to an electric wire is known. FIG. 2 is a perspective view showing an example of rubber plug. FIG. 3 shows an example of form of use of the rubber plug. As shown in FIG. 3, a rubber plug 5 is, for example, attached to a covered electric wire 6 having a crimp terminal 7 crimped to a tip thereof. As shown in FIG. 2, some rubber plugs have a cylindrical shape that is axially asymmetrical.

In the case where, for example, the rubber plug shown in FIG. 2 is to be supplied to a rubber plug insertion device or the like that inserts a rubber plug into an electric wire, the rubber plug needs to be supplied with an adjusted orientation. A rubber plug supply apparatus that supplies a rubber plug to another device in a state where the orientation of the rubber plug is adjusted is also conventionally known. For example, Patent Literature 1 discloses a rubber plug supply apparatus including a cylinder capable of accommodating a great number of rubber plugs, a takeout tube connected with the cylinder, a receiving portion receiving the rubber plugs coming out of the takeout tube, a posture correction portion correcting the orientation of each of the rubber plugs, a transportation portion transporting the rubber plugs from the receiving portion to the posture correction portion, and a transfer portion that transfers the rubber plugs each having the orientation thereof corrected by the posture correction portion to the outside of the rubber plug supply apparatus.

CITATION LIST

Patent Literature

Patent Literature 1: Japanese Laid-Open Patent Publication No. 2009-173448

SUMMARY OF INVENTION

Technical Problem

In the rubber plug supply apparatus disclosed in Patent Literature 1, the rubber plug that has passed through the takeout tube drops toward an orientation correction device that corrects the orientation of the rubber plug (the orientation correction device is a mechanism that corrects the orientation of the rubber plug supplied from the takeout tube, and in the case of Patent Literature 1, is a mechanism including the receiving portion, the transportation portion and the posture correction portion), and is transferred to an accommodation hole (receiving port) formed in the orientation correction device. However, in actuality, the rubber plug is not always accommodated into the accommodation port smoothly, and there may occur an inconvenience that the rubber plug is stuck in the vicinity of an entrance of the accommodation port. When such an inconvenience occurs, the rubber plug is not transported smoothly to the outside of the rubber plug supply apparatus.

The present invention made in light of the above-described points has an object of providing a rubber plug supply apparatus capable of allowing, with more certainty, a rubber plug to be accommodated into an orientation correction device that corrects the orientation of the rubber plug.

Solution to Problem

A rubber plug supply apparatus according to the present invention includes a supply device, a sensor, an orientation correction device, a dispatch device, and an accommodation assistance device. The supply device includes an accommodation portion accommodating a rubber plug, a supply path, in communication with the accommodation portion, through which the rubber plug passes, and a discharge port from which the rubber plug is discharged after passing through the supply path. The sensor detects an orientation of the rubber plug supplied by the supply device. The orientation correction device includes an accommodation hole accommodating the rubber plug. The orientation correction device changes the orientation of the rubber plug to a predetermined orientation in the case where the orientation of the rubber plug detected by the sensor is different from the predetermined orientation. The dispatch device dispatches the rubber plug adjusted to be in the predetermined orientation. The accommodation assistance device moves one of, or both of, the accommodation hole and the discharge port to move the position of the accommodation hole with respect to the discharge port at least between a first position directly facing the discharge port and a second position shifted from the first position and facing a part of the discharge port.

According to the above-described rubber plug supply apparatus, the accommodation assistance device moves the position of the accommodation hole with respect to the discharge port between the first position directly facing the discharge port and the second position shifted from the first position and facing a part of the discharge port. Namely, the above-described rubber plug supply apparatus performs a motion of slightly moving the position of the accommodation hole with respect to the discharge port. This provides an effect of swinging one of, or both of, the accommodation hole and discharge port, and therefore, the rubber plug is easily accommodated into the accommodation hole. As a result, the rubber plug is accommodated into the orientation correction device with more certainty.

According to a second embodiment as a preferred embodiment of the present invention, the accommodation assistance device moves the position of the accommodation hole with respect to the discharge port among the first position, the second position and a third position set to be symmetrical to the second position with respect to the first position.

According to this embodiment, the position of the accommodation hole with respect to the discharge port is moved also to a third position set to be symmetrical to the second position with respect to the first position, which directly faces the discharge port. Therefore, the effect of swinging the accommodation hole or the discharge port is further exhibited. As a result, the rubber plug is accommodated into the accommodation hole more easily.

According to a third embodiment as a preferred embodiment of the present invention, the accommodation assistance device repeats moving the accommodation hole with respect to the discharge port.

According to this embodiment, the movement of the accommodation hole with respect to the discharge port is repeated. Therefore, the effect of swinging the accommodation hole or the discharge port is still further exhibited. As a result, the rubber plug is accommodated into the accommodation hole still more easily.

According to a fourth embodiment as a preferred embodiment of the present invention, the orientation correction device includes a movable body including the accommodation hole, an orientation change device changing the orientation of the rubber plug, and a transportation device capable of moving the movable body. The transportation device is capable of moving the movable body between a position at which the accommodation hole is in communication with the discharge port and a position at which the accommodation hole is connected with the orientation change device. The accommodation assistance device drives the transportation device to move the position of the accommodation hole with respect to the discharge port between the first position and the second position.

According to this embodiment, the position of the accommodation hole with respect to the discharge port is moved by moving the movable body including the accommodation hole and transporting the rubber plug from the supply device to the direction change device. Therefore, there is no need to provide a special element to move the discharge port or the accommodation hole.

According to a fifth embodiment as a preferred embodiment of the fourth embodiment, the orientation change device includes a hole that is capable of accommodating the rubber plug and is to be in communication with the accommodation hole. The accommodation assistance device drives the transportation device to move the position of the accommodation hole with respect to the hole at least between a position directly facing the hole and a position that is shifted from the position directly facing the hole and faces a part of the hole.

According to this embodiment, the rubber plug supply device moves the movable body to move the position of the accommodation hole with respect to the hole of the orientation change device between the directly facing position and the position slightly shifted from the directly facing position. Therefore, the rubber plug is moved from the accommodation hole to the hole with more certainty for a reason substantially the same as the reason in the case where the rubber plug is moved from the discharge port to the accommodation hole.

According to a sixth embodiment as a preferred embodiment of the fourth embodiment, the orientation change device includes a rotatable body including a hole that is capable of accommodating the rubber plug and is to be in communication with the accommodation hole, a rotation shaft extending in a direction perpendicular to an axial direction of the hole, and a rotation driving portion rotating the rotatable body about the rotation shaft. The accommodation assistance device drives the rotation driving portion to move the position of the hole with respect to the accommodation hole at least between a position directly facing the accommodation hole and a position that is shifted from the position directly facing the accommodation hole and faces a part of the accommodation hole.

According to this embodiment, the rubber plug supply device rotates the rotatable body of the orientation change device to move the position of the accommodation hole with respect to the hole of the rotatable body between the directly facing position and the position slightly shifted from the directly facing position. Therefore, the rubber plug is moved from the accommodation hole to the hole with more certainty for a reason substantially the same as the reason in the case where the rubber plug is moved from the discharge port to the accommodation hole.

According to a seventh embodiment as a preferred embodiment of the fourth embodiment, the orientation change device includes a hole that is capable of accommodating the rubber plug and is to be in communication with the accommodation hole. The rubber plug supply apparatus further includes an insertion device injecting air into the accommodation hole in a state where the accommodation hole and the hole are in communication with each other, to push the rubber plug into the hole.

According to this embodiment, the rubber plug is moved from the accommodation hole to the hole with more certainty by the injection of the air performed by the insertion device.

According to an eighth embodiment as a preferred embodiment of the fourth embodiment, the orientation change device includes a hole that is capable of accommodating the rubber plug and is to be in communication with the accommodation hole. The rubber plug supply apparatus further includes an insertion device pushing the rubber plug into the hole. The insertion device includes a pressing body contacting the rubber plug in a state where the accommodation hole and the hole are in communication with each other, and a first actuator moving the pressing body. The insertion device drives the first actuator to press the rubber plug with the pressing body, and thus to push the rubber plug into the hole.

According to this embodiment, the rubber plug is moved from the accommodation hole to the hole with more certainty by the pressing on the rubber plug performed by the pressing body.

According to a ninth embodiment as a preferred embodiment of the fourth embodiment, the orientation change device includes a rotatable body including a hole that is capable of accommodating the rubber plug and is to be in communication with the accommodation hole, a rotation shaft extending in a direction perpendicular to an axial direction of the hole, and a rotation driving portion rotating the rotatable body about the rotation shaft. The orientation change device drives the rotation driving portion to rotate the rotatable body about the rotation shaft, and thus to change the orientation of the rubber plug. The hole includes a small portion having a cross-section smaller than that of a maximum outer shape of the rubber plug as seen in the axial direction of the hole. The dispatch device dispatches the rubber plug from the hole at least in the case where the orientation of the rubber plug is changed by the orientation change device. The small portion stops the rubber plug, inserted into the hole, at a central portion of the hole in the axial direction thereof, and, while the rubber plug is dispatched from the hole by the dispatch device, allows the rubber plug to pass therethrough in a deformed state.

According to this embodiment, the small portion stops the rubber plug at the central portion of the hole in the axial direction thereof, which makes it difficult for the rubber plug to jump out of the hole even though the rotatable body is rotated. Therefore, the rotatable body is allowed to rotate at a high speed, which shortens the time period required to correct the orientation of the rubber plug. While being dispatched from the hole by the dispatch device, the rubber plug is allowed to pass through the small portion in a deformed state. Therefore, the small portion does not prevent the rubber plug from being dispatched.

According to a tenth embodiment as a preferred embodiment of the fourth embodiment, the orientation change device includes a rotatable body including a hole that is capable of accommodating the rubber plug and is to be in communication with the accommodation hole, a rotation shaft extending in a direction perpendicular to an axial direction of the hole, and a rotation driving portion rotating the rotatable body about the rotation shaft. The orientation change device drives the rotation driving portion to rotate the rotatable body about the rotation shaft, and thus to change the orientation of the rubber plug. The rubber plug supply apparatus further includes a stopper device including a stopper inserted into the hole in a state where the hole is in communication with the accommodation hole, and a second actuator inserting the stopper into the hole and separating the stopper from the hole. The stopper, in a state of being inserted into the hole, stops the rubber plug, inserted into the hole, at a central portion of the hole in the axial direction thereof.

According to this embodiment, the stopper stops the rubber plug at the central portion of the hole in the axial direction thereof, which makes it difficult for the rubber plug to jump out of the hole even though the rotatable body is rotated. Therefore, the rotatable body is allowed to rotate at a high speed, which shortens the time period required to correct the orientation of the rubber plug.

According to an eleventh embodiment as a preferred embodiment of the fourth embodiment, the orientation change device includes a hole that is capable of accommodating the rubber plug and is to be in communication with the accommodation hole. The dispatch device includes a dispatch path, in communication with the hole, through which the rubber plug passes, a first injection portion connected with the hole, the first injection portion injecting air in a dispatch direction of the rubber plug, and a second injection portion provided at the dispatch path, the second injection portion injecting air in the dispatch direction of the rubber plug.

According to this embodiment, the first injection portion provided upstream in the dispatch direction of the rubber plug with respect to the hole and pushing the rubber plug by the injection of the air, and the second injection portion provided downstream in the dispatch direction of the rubber plug with respect to the hole and pulling the rubber plug by a pressure decreasing effect provided by the injection of the air, dispatch the rubber plug more effectively. In addition, the rubber plug transported to a position downstream in the dispatch direction with respect to the second injection portion is pushed by the air injected by the second injection portion. Therefore, the rubber plug is dispatched at a higher speed.

According to a twelfth embodiment as a preferred embodiment of the present invention, the orientation change device includes a rotatable body including the accommodation hole, a rotation shaft extending in a direction perpendicular to an axial direction of the accommodation hole, and a rotation driving portion rotating the rotatable body about the rotation shaft. The accommodation assistance device drives the rotation driving portion to move the position of the accommodation hole with respect to the discharge port between the first position and the second portion.

According to this embodiment, the position of the accommodation hole with respect to the discharge port is moved by rotating the rotatable body including the accommodation hole. Therefore, there is no need to provide a special element to move the discharge port or the accommodation hole.

According to a thirteenth embodiment as a preferred embodiment of the twelfth embodiment, the accommodation hole includes a small portion having a cross-section smaller than that of a maximum outer shape of the rubber plug as seen in the axial direction of the accommodation hole. The dispatch device dispatches the rubber plug from the accommodation hole. The small portion stops the rubber plug, inserted into the accommodation hole, at a central portion of the accommodation hole in the axial direction thereof, and, while the rubber plug is dispatched from the accommodation hole by the dispatch device, allows the rubber plug to pass therethrough in a deformed state.

According to this embodiment, substantially the same function and effect as those of the ninth embodiment are provided.

According to a fourteenth embodiment as a preferred embodiment of the twelfth embodiment, the rubber plug supply apparatus further includes a stopper device including a stopper insertable into the accommodation hole at least in a state where the accommodation hole is at the first position with respect to the discharge port, and a second actuator inserting the stopper into the accommodation hole and separating the stopper from the accommodation hole. The stopper, in a state of being inserted into the accommodation hole, stops the rubber plug, inserted into the accommodation hole, at a central portion of the accommodation hole in the axial direction thereof.

According to this embodiment, substantially the same function and effect as those of the tenth embodiment are provided.

According to a fifteenth embodiment as a preferred embodiment of the twelfth embodiment, the dispatch device includes a dispatch path, in communication with the accommodation hole, through which the rubber plug passes, a first injection portion connected with the accommodation hole, the first injection portion injecting air in the dispatch direction of the rubber plug, and a second injection portion connected with the dispatch path, the second injection portion injecting air in the dispatch direction of the rubber plug.

According to this embodiment, substantially the same function and effect as those of the eleventh embodiment are provided.

According to a sixteenth embodiment as a preferred embodiment of the twelfth embodiment, the rotatable body is rotatable among a first rotation position at which the accommodation hole directly faces the discharge port, a second rotation position at which the accommodation hole is connected with the dispatch device, and a third rotation position beyond the second rotation position as seen from the first rotation position. The rotatable body includes another accommodation hole directly facing the discharge port in a state where the rotatable body is at the second rotation position. The accommodation assistance device drives the rotation driving portion to rotate the rotatable body from the first rotation position to the third rotation position and further from the third rotation position to the second rotation position.

According to this embodiment, the rotatable body includes another accommodation hole that directly faces the discharge port in a state where the rotatable body is at the second rotation position, at which the accommodation hole is connected with the dispatch device. This allows the dispatch of one rubber plug and the accommodation of the next rubber plug into the accommodation hole to be performed at the same time. In addition, according to this embodiment, the rubber plug supply apparatus positions the rotatable body at the third position beyond the second rotation position before positioning the rotatable body at the second rotation position. The motion of positioning the rotatable body at the third rotation position causes the next rubber plug to be bent by the another accommodation hole. In addition, the motion of positioning the rotatable body at the second rotation position solves the bending of the next rubber plug. As a result of the bending being solved, the next rubber plug is swung, and thus is easily accommodated into the another accommodation hole.

According to a seventeenth embodiment as a preferred embodiment of the present invention, the supply device includes an air supply portion connected with the accommodation portion, the air supply portion sending air to the accommodation portion. The supply path has a tubular shape including one opening or a plurality of openings formed in a side surface thereof.

According to this embodiment, the pressurization on the accommodation portion by the air supply portion assists the rubber plug in moving from the accommodation portion to the supply path. In this embodiment, the supply path includes one opening or the plurality of openings formed in the side surface thereof. Therefore, the air sent to the accommodation portion by the air supply portion is partially discharged from the opening(s) via the supply path. This allows the difference in the air pressure between the accommodation portion and the supply path to be maintained stably regardless of the state of the rubber plug in the supply path. As a result, the movement of the rubber plug from the accommodation portion to the supply path is assisted stably.

According to an eighteenth embodiment as a preferred embodiment of the seventeenth embodiment, the one opening or the plurality of openings include an opening formed in a portion closer to the discharge port than a middle portion of the supply path.

According to this embodiment, at least a part of the opening(s) is formed in the portion closer to the discharge port than the middle portion of the supply path. Because of the opening, a flow of the air in the supply path toward the discharge port is generated stably regardless of the state of the rubber plug in the supply path. This flow of the air assists, stably, the rubber plug in moving in the supply path.

According to a nineteenth embodiment as a preferred embodiment of the seventeenth embodiment, the discharge port is formed at one end among two ends of the supply path. The one opening or the plurality of openings include an opening formed so as to reach the one end.

According to this embodiment, at least a part of the opening(s) reaches the discharge port. Therefore, a flow of the air toward the discharge port is generated stably in the entirety of the supply path regardless of the state of the rubber plug in the supply path. This flow of the air assists, stably, the rubber plug in moving in the supply path.

Advantageous Effects of Invention

According to the present invention, the rubber plug is accommodated, with more certainty, into the orientation correction device that corrects the orientation of the rubber plug.

DESCRIPTION OF EMBODIMENTS

Hereinafter, embodiments of the present invention will be described with reference to the drawings. The embodiments described herein are not intended to limit the present invention, needless to say. Elements and portions having the same functions will bear the same reference signs, and overlapping descriptions thereof will be omitted or simplified when appropriate.

Embodiment 1

Figure 1:
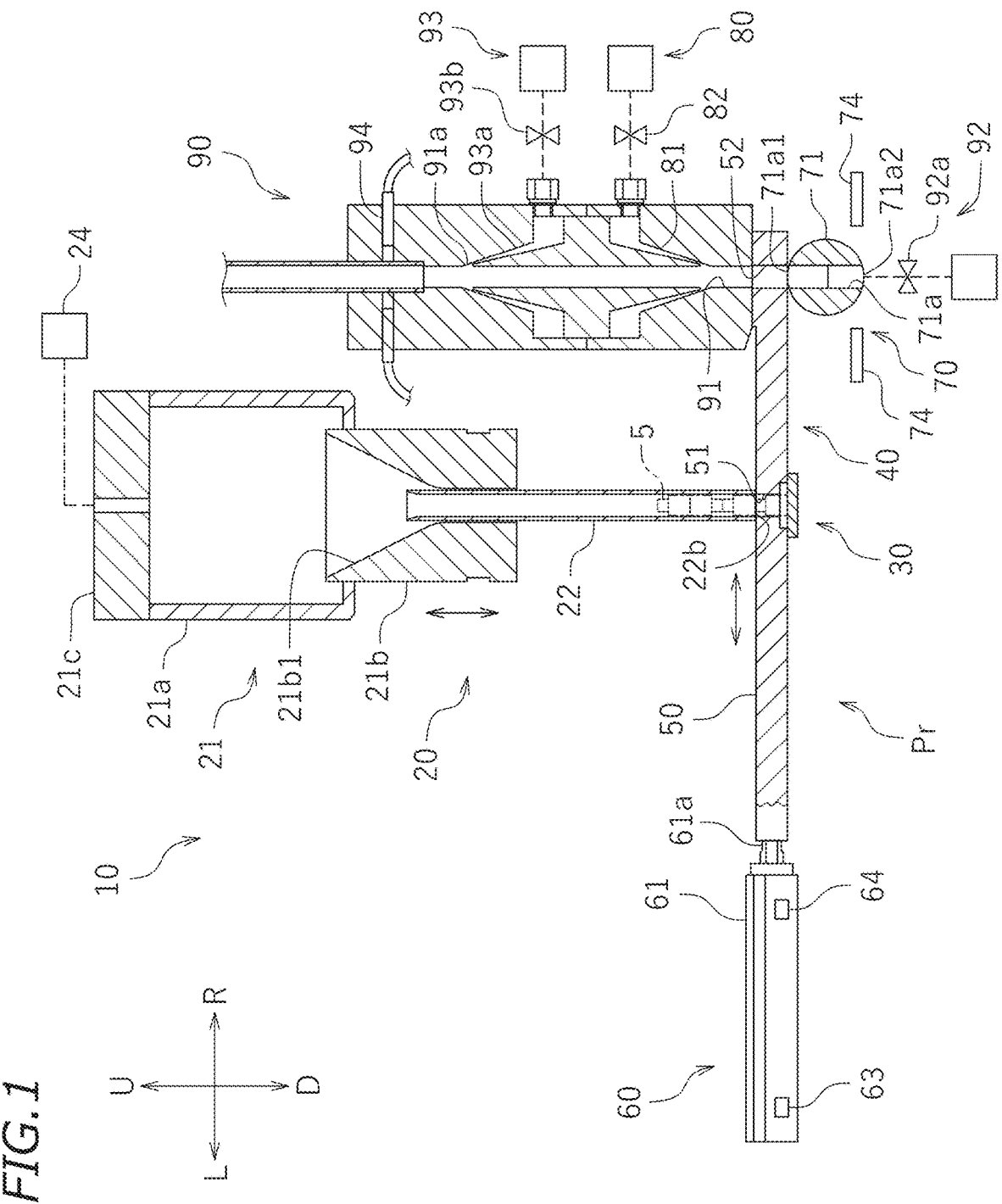
FIG. 1 is a schematic partial cross-sectional view of a rubber plug supply apparatus according to embodiment 1.

FIG. 1 is a schematic partial cross-sectional view of a rubber plug supply apparatus 10 according to an embodiment. The rubber plug supply apparatus 10 supplies rubber plugs 5, one by one, to another device, for example, an electric wire insertion device (not shown) inserting an electric wire into the rubber plug 5. In the following description, the side closer to the viewer of FIG. 1 will be referred to as the "front side" of the rubber plug supply apparatus 10, unless otherwise specified. The terms "left", "right", "up" and "down" will respectively refer to left, right, up and down as seen from the front side of the rubber plug supply apparatus 10. In the figures, letters L, R, U, D respectively represent left, right, up and down. In the following description, the "rotation direction" will refer to the rotation direction as seen from the front side of the rubber plug supply apparatus 10, unless otherwise specified. It should be noted that these directions are merely defined for the sake of convenience, and do not limit the manner of installation of the rubber plug supply apparatus 10 in any way. These directions do not limit the present invention in any way.

Figure 2:
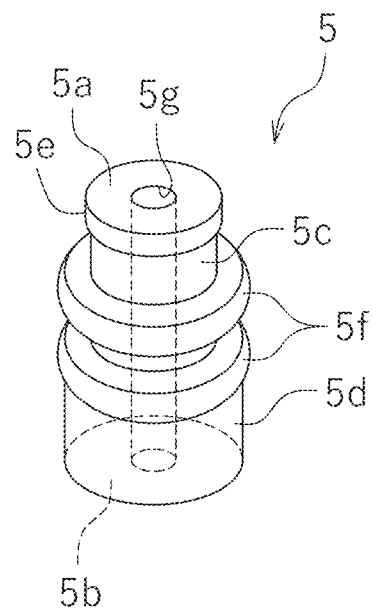
FIG. 2 is a perspective view of a rubber plug.

As shown in FIG. 2, the rubber plug 5 according to this embodiment has a cylindrical shape that is axially asymmetrical. The rubber plug 5 includes a short diameter portion 5c and a long diameter portion 5d. The long diameter portion 5d has a diameter longer than that of the short diameter portion 5c. A ring portion 5e having a diameter slightly longer than that of the short diameter portion 5c is formed at a tip of the short diameter portion 5c. Two ring portions 5f each having a diameter slightly longer than that of the long diameter portion 5d are formed in the vicinity of a portion of the long diameter portion 5d that is connected with the short diameter portion 5c. Hereinafter, an end of the rubber plug 5 on the side of the short diameter portion 5c will be referred to as a "front end 5a of the rubber plug 5" when appropriately. Hereinafter, an end of the rubber plug 5 on the side of the long diameter portion 5d will be referred to as a "rear end 5b of the rubber plug 5" when appropriately. While the rubber plug is dispatched to another device by the rubber plug supply apparatus 10, the front end 5a is directed forward in a dispatch direction. While the rubber plug 5 is dispatched to another device by the rubber plug supply apparatus 10, the rear end 5b is directed rearward in the dispatch direction. The rubber plug 5 has a through-hole 5g running therethrough from the front end 5a to the rear end 5b. It should be noted that the shape of the rubber plug 5 described herein is merely an example, and there is no specific limitation on the shape of the rubber plug 5.

Figure 3:
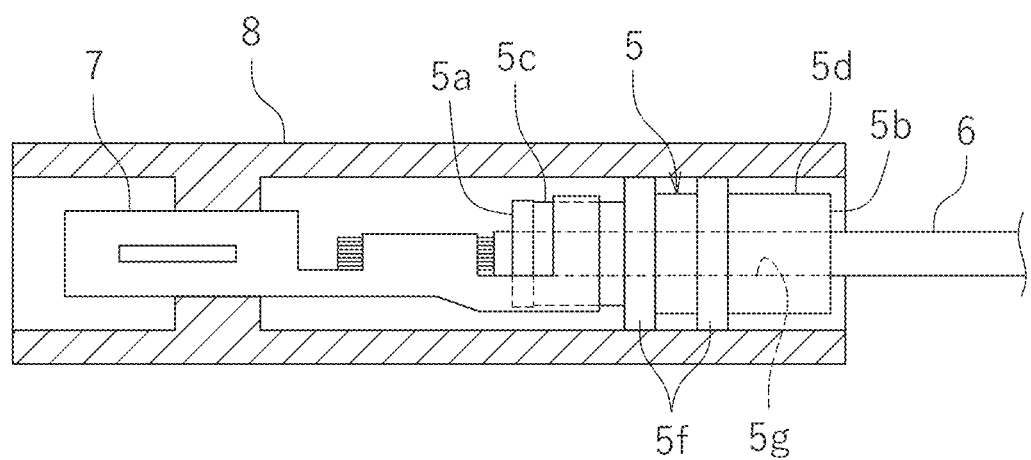
FIG. 3 shows an example of form of use of the rubber plug.

As shown in FIG. 3, the rubber plug 5 is, for example, attached to a covered electric wire 6 (hereinafter, referred to as the "electric wire 6"). The electric wire 6 has a tip to be inserted into the through-hole 5g of the rubber plug 5. The electric wire 6 is inserted into the through-hole 5g from an opening at the rear end 5b and is taken out from an opening at the front end 5a. Then, the cover at the tip of the electric wire 6 is peeled off, and a crimp terminal 7 is crimped to the tip. At this point, the crimping of the crimp terminal 7 causes the rubber plug 5 to be secured to the electric wire 6. In addition, an assembly of the electric wire 6, the rubber plug 5 and the crimp terminal 7 is inserted into a housing 8 specifically provided therefor. As shown in FIG. 3, the ring portions 5f of the rubber plug 5 are in contact with an inner circumferential surface of the housing 8 to prevent entrance of moisture into the housing 8. The rubber plug 5 is a water-proof rubber plug. It should be noted that the form of use of the rubber plug 5 described herein is merely an example, and there is no specific limitation on the form of use of the rubber plug 5.

The rubber plug supply apparatus 10 dispatches the rubber plug 5 to another device in a state where the orientation of the rubber plug 5 is adjusted such that the front end 5a is directed forward in the dispatch direction. The rubber plug supply apparatus has a function of adjusting the orientation of the rubber plug 5 provided in a random orientation. As shown in FIG. 1, the rubber plug supply apparatus 10 includes a supply device 20, an orientation detection device 30, an orientation correction device 40, an insertion device 80, a dispatch device 90, and a controller 100 (see FIG. 7) controlling operations of these components.

Figure 4:
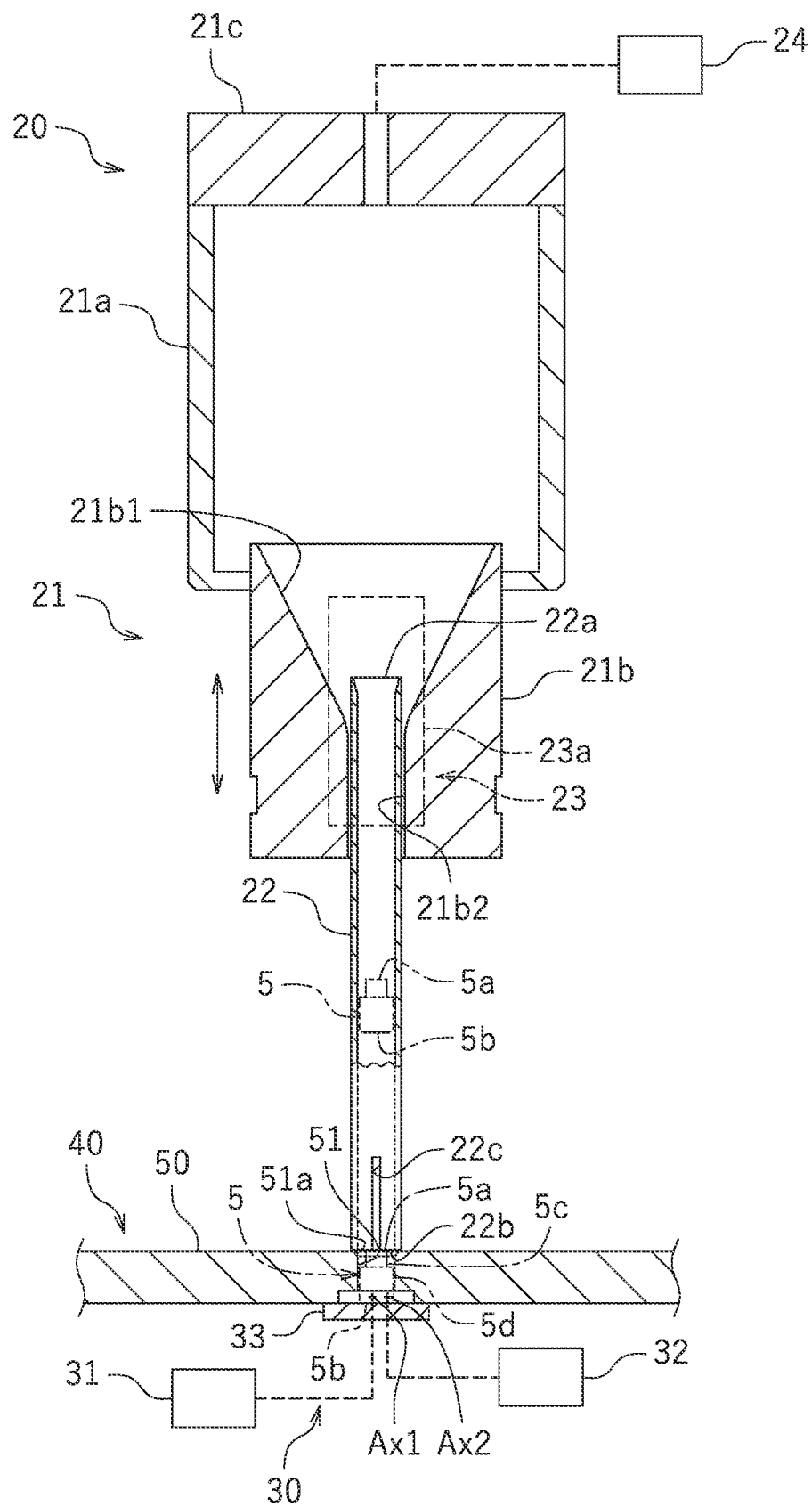
FIG. 4 is a schematic partial cross-sectional view of a supply device.

FIG. 4 is a schematic partial cross-sectional view of the supply device 20. The supply device 20 supplies the rubber plug 5 to the orientation correction device 40. As shown in FIG. 4, the supply device 20 includes an accommodation tank 21, a supply tube 22, a supply tank moving portion 23, and an air supply portion 24. The accommodation tank 21 is a box-like component capable of accommodating a great number of rubber plugs 5. The great number of rubber plugs 5 are provided as being contained in a container such as, for example, a vinyl bag. The great number of rubber plugs 5 are transferred from the container to the accommodation tank 21. At this point, the great number of rubber plugs 5 are not in the same orientation.

The accommodation tank 21 includes a cylindrical portion 21a provided in a top portion thereof and a hopper portion 21b provided in a bottom portion thereof. The hopper portion 21b forms an inclining bottom surface of the accommodation tank 21. The hopper portion 21b has an inclining surface 21b1 inclining downward so as to converge at the center of the accommodation tank 21. The hopper portion 21b is inserted into a bottom end of the cylindrical portion 21a, and is movable in an up-down direction with respect to the cylindrical portion 21a. The hopper portion 21b includes a supply tube insertion hole 21b2 formed therein, which is connected to a bottom end of the inclining surface 21b1 and extending in the up-down direction.

The supply tube 22 is a supply path for the rubber plug 5, through which the rubber plug 5 passes. The supply tube 22 extends in the up-down direction. The supply tube 22 is tubular, and is in communication with the accommodation tank 21. In more detail, the supply tube 22 is inserted into the supply tube insertion hole 21b2. A top end of the supply tube 22 is located in the accommodation tank 21. At the top end of the supply tube 22, a supply port 22a, into which the rubber plug 5 in the accommodation tank 21 is to drop, is formed. At a bottom end of the supply tube 22, a discharge port 22b, from which the rubber plug 5 is discharged after passing through the supply tube 22, is formed.

The supply tube 22 is cylindrical. The supply tube 22 has an inner dimeter slightly longer than an outer diameter of the rubber plug 5. The supply tube 22 has an inner diameter that is sized to allow the rubber plug 5 to pass through the supply tube 22 in a state where one of the front end 5a and the rear end 5b is directed forward in an advancing direction. The rubber plug 5 is not allowed to pass through the supply tube 22 in any other orientation. A plurality of the rubber plugs 5 are not allowed to pass through the supply tube 22 while being located side by side in a radial direction thereof. The rubber plugs 5 are supplied downstream one by one through the supply tube 22. The orientation of each of the rubber plugs 5 is corrected by the rubber plug 5 passing through the supply tube 22, such that the front end 5a or the rear end 5b is directed forward in the advancing direction.

As shown in FIG. 4, the supply tube 22 includes a slit 22c formed in a side surface thereof. In this embodiment, the slit 22c is formed in a portion closer to the discharge port 22b than a middle portion of the supply tube 22. The slit 22c extends in a direction in which the supply tube 22 extends (in this embodiment, in the up-down direction). As shown in FIG. 4, the slit 22c reaches the bottom end, of the supply tube 22, at which the discharge port 22b is formed. Namely, the slit 22c has an open bottom end. In FIG. 4, only one slit 22c is shown. There may be a plurality of slits 22c, or there may be one slit 22c. In this embodiment, the slit 22c does not extend to a portion closer to the supply port 22a than the middle portion of the supply tube 22. Alternatively, the slit 22c may extend to the portion closer to the supply port 22a than the middle portion. A functions of the slit 22c will be described below.

The supply tank moving portion 23 causes a reciprocating motion of the hopper portion 21b in the up-down direction. This reciprocating motion swings the rubber plug 5 on the inclining surface 21b1 of the hopper portion 21b. This makes it easy for the rubber plug 5 in the accommodation tank 21 to drop into the supply port 22a of the supply tube 22. The hopper portion 21b is slidably in engagement with a guide rail 23a of the supply tank moving portion 23. The hopper portion 21b is caused to make a reciprocating motion along the guide rail 23a by a driving portion 23b (see FIG. 7) of the supply tank moving portion 23. There is no specific limitation on the driving portion 23b. The driving portion 23b is, for example, an air cylinder.

The air supply portion 24 is connected with the accommodation tank 21 and sends air to the accommodation tank 21. The air supply portion 24 sends the air into the accommodation tank 21 to pressurize the inside of the accommodation tank 21. The air sent by the air supply portion 24 assists the rubber plug 5 in the accommodation tank 21 in dropping into the supply port 22a. The air sent by the air supply portion 24 also assists the rubber plug 5 in moving in the supply tube 22. In this embodiment, the air supply portion 24 is connected with a lid 21c of the accommodation tank 21.

As shown in FIG. 4, the orientation detection device 30 includes an orientation detection sensor 32 detecting the orientation of the rubber plug 5 supplied by the supply device 20. In the case where the orientation of the rubber plug 5 detected by the orientation detection sensor 32 is different from a predetermined orientation, the orientation correction device 40 changes the orientation of the rubber plug 5 to the predetermined orientation. The dispatch device 90 (see FIG. 1) dispatches the rubber plug 5 adjusted to be in the predetermined orientation. In this embodiment, the orientation correction device 40 includes a first through-hole 51 formed as an accommodation hole in which the rubber plug 5 supplied from the supply device 20 is to be accommodated, and the orientation detection device 30 detects the orientation of the rubber plug 5 accommodated in the first through-hole 51.

As shown in FIG. 4, the orientation detection device 30 includes an arrival confirmation sensor 31, the orientation detection sensor 32, and a rubber plug receiving portion 33. The rubber plug receiving portion 33 is located below the first through-hole 51. The first through-hole 51 runs throughout the orientation correction device in the up-down direction. At a top end of the first through-hole 51, a chamfered portion 51a, which makes it easy for the rubber plug 5 to be accommodated into the first through-hole 51, is formed. The chamfered portion 51a may have any shape formed by any known chamfering such as light chamfering, generally C-shaped chamfering, round chamfering or the like with no specific limitation. As shown in FIG. 4, the chamfered portion 51a may be a C-shaped-chamfered portion, which is easily formed. Alternatively, the chamfered portion 51a may be a round-chamfered portion, by which the top end of the first through-hole 51 has less edges. The rubber plug receiving portion 33 receives the rubber plug 5 so as to prevent the rubber plug 5, accommodated into the first through-hole 51 with the assistance of the air supply portion 24, from being released from a bottom end of the first through-hole 51. A distance in the up-down direction between the rubber plug receiving portion 33 and the top end of the first through-hole 51 is set to be generally equal to a length of the rubber plug 5 in an axial direction thereof. Such an arrangement prevents the next rubber plug 5 from partially entering the first through-hole 51. The arrival confirmation sensor 31 detects that the rubber plug 5 has been accommodated in the first through-hole 51. The orientation detection sensor 32 detects the orientation of the rubber plug 5 when the rubber plug 5 stops as a result of hitting the rubber plug receiving portion 33.

In this embodiment, the arrival confirmation sensor 31 and the orientation detection sensor 32 are both optical sensors. The arrival confirmation sensor 31 and the orientation detection sensor 32 each include a light projector and a light receiver. As shown in FIG. 4, the light projector of the arrival confirmation sensor 31 emits light having an optical axis Ax1 (also see FIG. 9) in a horizontal direction. The light receiver of the arrival confirmation sensor 31 receives the light emitted by the light projector. As shown in FIG. 4, when the rubber plug 5 is accommodated in the first through-hole 51, the light emitted by the light projector of the arrival confirmation sensor 31 is blocked by the rubber plug 5 and does not reach the light receiver. In this manner, the rubber plug 5 is detected to have been accommodated in the first through-hole 51.

As shown in FIG. 4, the light projector of the orientation detection sensor 32 emits light having an optical axis Ax2 (also see FIG. 9) in the horizontal direction. The light receiver of the orientation detection sensor 32 receives the light emitted by the light projector. As shown in FIG. 4, in the case where the rubber plug 5 is accommodated in the first through-hole 51 in a state where the front end 5a is directed upward (hereinafter, this orientation of the rubber plug 5 will be referred to also as a "normal orientation"), the light emitted by the light projector of the orientation detection sensor 32 is blocked by the long diameter portion 5d and does not reach the light receiver. Although not shown, in the case where the rubber plug 5 is accommodated in the first through-hole 51 in a state where the rear end 5b is directed upward (hereinafter, this orientation of the rubber plug 5 will be referred to also as a "reverse orientation"), the light emitted by the light projector of the orientation detection sensor 32 passes through a space to the side of the short diameter portion 5c and reaches the light receiver. The orientation detection sensor 32 detects the orientation of the rubber plug 5 in accordance with whether or not the receiver receives the light.

It should be noted that there is no specific limitation on the detection system of the arrival confirmation sensor 31 or the orientation detection sensor 32. For example, the arrival of the rubber plug 5 at the first through-hole 51 and the orientation of the rubber plug 5 in the first through-hole 51 may be detected by one width detection sensor that emits band-like light. Alternatively, the arrival of the rubber plug 5 at the first through-hole 51 and the orientation of the rubber plug 5 in the first through-hole 51 may be detected by, for example, an image recognition device.

As shown in FIG. 1, the orientation correction device 40 includes a movable body 50, a transportation device 60, and an orientation change device 70. The movable body 50 includes the first through-hole 51 formed therein. The transportation device 60 moves the movable body 50 to transport the rubber plug 5 from the supply device 20 to the orientation change device 70 or the dispatch device 90. The orientation change device 70 changes the orientation of the rubber plug 5. In this embodiment, the orientation change device 70 and the dispatch device 90 are located to the right of the supply device 20, and the transportation device 60 slides the movable body 50 in a left-right direction. It should be noted that the system of moving the movable body 50 is not limited to the sliding system. The movable body 50 may be, for example, a rotary table that rotates on a horizontal plane.

Figure 5:
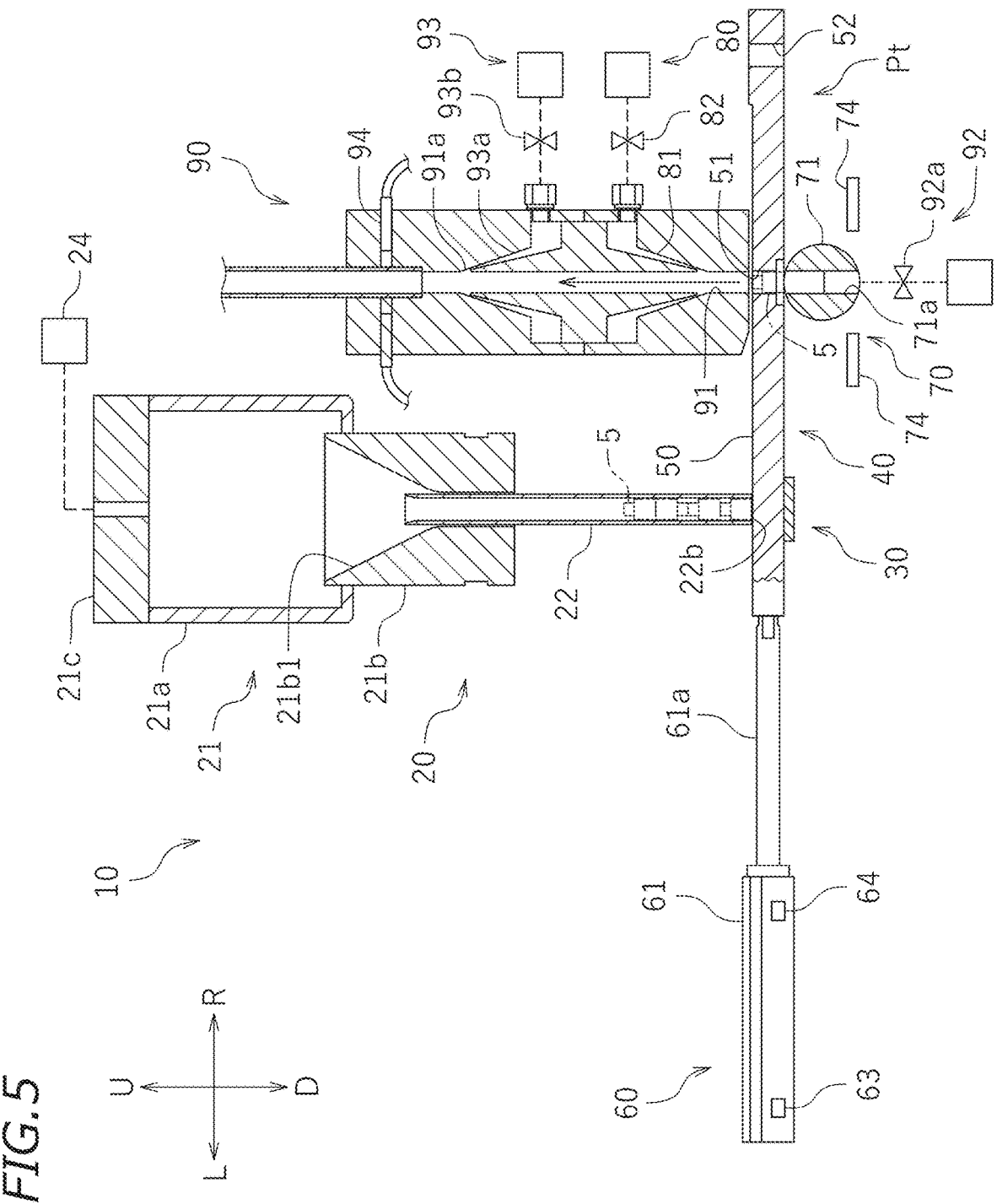
FIG. 5 is a partial cross-sectional view schematically showing the rubber plug supply apparatus in a state where a movable body is at a dispatch position.

FIG. 5 is a partial cross-sectional view schematically showing the rubber plug supply apparatus 10 in a state where the movable body 50 has moved from the state shown in FIG. 1 and is at a dispatch position Pt. As shown in FIG. 5, the dispatch position Pt is a position of the movable body 50 at which the first through-hole 51 is connected with the orientation change device 70 and the dispatch device 90. In this state, the orientation change device 70 is connected with the first through-hole 51 from below. The dispatch device 90 is connected with the first through-hole 51 from above. Hereinafter, the position of the movable body 50 shown in FIG. 1, at which the first through-hole 51 is in communication with the discharge port 22*b* of the supply tube 22, will be referred to also as a "receiving position Pr". The transportation device 60 is capable of moving the movable body 50 between the receiving position Pr and the dispatch position Pt.

As shown in FIG. 5, when the movable body 50 is at the dispatch position Pt, the first through-hole 51 is connected with the orientation change device 70 and the dispatch device 90. As described below in detail, in the case where the orientation of the rubber plug 5 detected by the orientation detection sensor 32 is the normal orientation, the rubber plug 5 is dispatched by the dispatch device 90 immediately after the movable body 50 moves to the dispatch position Pt. In the case where the orientation of the rubber plug 5 detected by the orientation detection sensor 32 is the reverse orientation, the rubber plug 5 is moved to the orientation change device 70 after the movable body 50 moves to the dispatch position Pt. The orientation of the rubber plug 5 is inverted by 180 degrees by the orientation change device 70. Then, the rubber plug 5 is dispatched by the dispatch device 90.

As shown in FIG. 1, the movable body 50 further includes a second through-hole 52 running therethrough in the up-down direction. As shown in FIG. 1, the second through-hole 52 is connected with the orientation change device 70 and the dispatch device 90 when the movable body 50 is at the receiving position Pr.

In this embodiment, the transportation device 60 includes a guide rail (not shown) slidably in engagement with the movable body 50, an air cylinder 61, a transportation valve 62 (see FIG. 7), a first position sensor 63, and a second position sensor 64. As shown in FIG. 1 and FIG. 5, the air cylinder 61 includes a rod 61*a* extendable and contractable in the left-right direction. A tip of the rod 61*a* is secured to the movable body 50. The transportation valve 62 is, for example, a solenoid valve. The transportation valve 62 supplies compressed air usable to extend and contract the rod 61*a* to the air cylinder 61 or stops such a supply in accordance with the control by the controller 100. The transportation valve 62 is driven to extend or contract the rod 61*a*, and as a result, the movable body 50 moves in the left-right direction.

The first position sensor 63 detects whether or not the rod 61*a* is at a position corresponding to the receiving position Pr of the movable body 50. The first position sensor 63 is, for example, a proximity sensor reactive to a magnetic body built in the rod 61*a*. It is learned by the detection by the first position sensor 63 that the movable body 50 is at the receiving position Pr. The second position sensor 64 detects whether or not the rod 61*a* is at a position corresponding to the dispatch position Pt of the movable body 50. The second position sensor 64 is also, for example, a proximity sensor. It is learned by the detection by the second position sensor 64 that the movable body 50 is at the dispatch position Pt. It should be noted that the transportation device 60 is not limited to having the above-described structure. The transportation device 60 may include, for example, an electric motor and a ball screw. There is no specific limitation on the system used by the first position sensor 63 or the second position sensor 64.

The transportation device 60 has a function of swinging the movable body 50 in the left-right direction in addition to the function of moving the movable body 50 between the receiving position Pr and the dispatch position Pt. Such a swing motion is performed by using a solenoid valve as the transportation valve 62 and switching the direction of the air by a short time cycle. It should be noted that there is no specific limitation on the method of control by which the transportation device 60 swings the movable body 50. The swing motion will be described below in detail.

Figure 6:
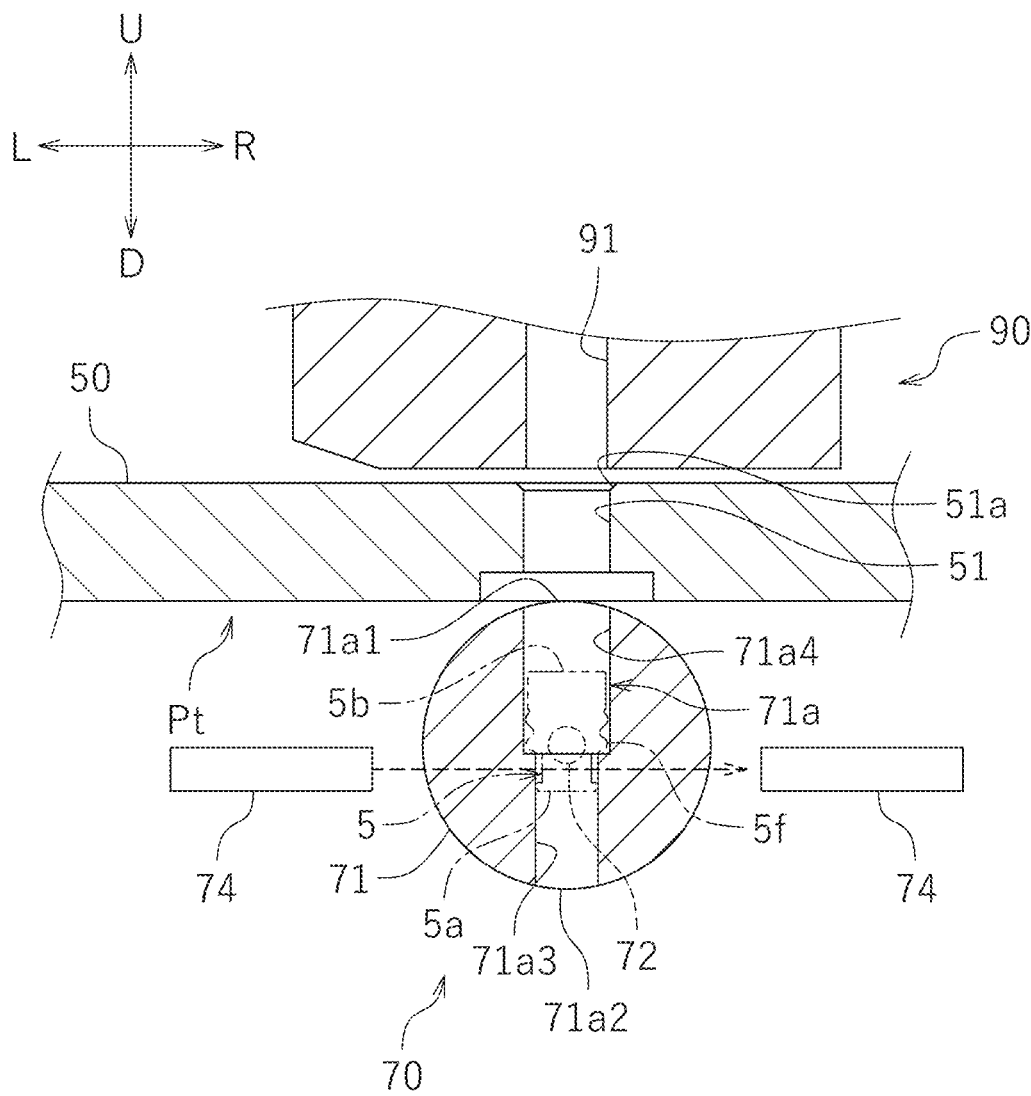
FIG. 6 is a schematic cross-sectional view of an orientation change device.

FIG. 6 is a schematic cross-sectional view of the orientation change device 70. As shown in FIG. 6, the orientation change device 70 includes a rotatable body 71, a rotation shaft 72, a rotation driving portion 73 (see FIG. 7), and an arrival confirmation sensor 74. The orientation change device 70 drives the rotation driving portion 73 to rotate the rotatable body 71 about the rotation shaft 72, and thus to change the orientation of the rubber plug 5. The rotatable body 71 is circular as seen in a front-rear direction, and is rotatable about the rotation shaft 72. The rotatable body 71 includes a rotation through-hole 71*a* formed therein, which is capable of accommodating the rubber plug 5. The rotation through-hole 71*a* is formed to run through the center of the rotatable body 71 as seen in the front-rear direction (the center matches the rotation shaft 72), and runs throughout the rotatable body 71. The rotation through-hole 71*a* has a first end 71*a*1 and a second end 71*a*2 opened on a surface of the rotatable body 71. The first end 71*a*1 and the second end 71*a*2 are shifted with respect to each other by 180 degrees. As shown in FIG. 6, the first end 71*a*1 is directed upward and the second end 71*a*2 are directed downward except for during a change of the orientation of the rubber plug 5. When the rotatable body 71 is at such a rotation position that the first end 71*a*1 is directed upward and the movable body 50 is at the dispatch position Pt, the first end 71*a*1 of the rotation through-hole 71*a* is in communication with the bottom end of the first through-hole 51.

As shown in FIG. 1, the rubber plug supply apparatus 10 includes the insertion device 80 pushing the rubber plug 5 into the rotation through-hole 71*a*. In this embodiment, the insertion device 80 injects air into the first through-hole 51 in a state where the first through-hole 51 and the rotation through-hole 71 are in communication with each other, to push the rubber plug 5 into the rotation through-hole 71*a*. As a result, the rubber plug 5 held in the first through-hole 51 is accommodated into the rotation through-hole 71*a* of the rotatable body 71.

As shown in FIG. 5, the insertion device 80 includes an air flow path 81 and an insertion valve 82. The air flow path 81 is in communication with a dispatch tube 91 of the dispatch device 90. When the movable body 50 is at the dispatch position Pt, the dispatch tube 91 is in communication with the top end of the first through-hole 51. The air flow path 81 extends obliquely downward from an outer circumferential surface of the dispatch tube 91, and a tip of the air flow path 81 is in communication with the dispatch tube 91. The insertion valve 82 is, for example, a solenoid valve. When the insertion valve 82 is opened, compressed air is injected into the first through-hole 51 via the air flow path 81 and the dispatch tube 91. This downward flow of the air pushes the rubber plug 5 into the rotation through-hole 71*a*.

Whether or not the rubber plug 5 has been accommodated in the rotation through-hole 71*a* is detected by the arrival confirmation sensor 74. In this embodiment, the arrival confirmation sensor 74 is an optical sensor. The arrival confirmation sensor 74 detects whether not the rubber plug 5 has been accommodated in the rotation through-hole 71*a* by a method same as the method by which the arrival confirmation sensor 31 of the orientation detection device 30 detects whether or not the rubber plug 5 has been accommodated in the first through-hole 51. It should be noted that there is no specific limitation on the system used by the arrival confirmation sensor 74.

As shown in FIG. 6, the rotation through-hole 71*a* includes a small portion 71*a*3 having a diameter shorter than that of the rest of the rotation through-hole 71*a*. About a half of the rotation through-hole 71*a* on the side of the first end 71*a*1 is a main hole portion 71*a*4, which has a diameter longer than that of the small portion 71*a*3. The diameter of the main hole portion 71*a*4 is longer than the diameter of a portion of the rubber plug 5 having a maximum outer shape (in this embodiment, the ring portions 5*f*). By contrast, the small portion 71*a*3 has a cross-section smaller than that of the maximum outer shape of the rubber plug 5 (in this embodiment, the outer shape of the ring portions 5*f*) as seen in an axial direction of the rotation through-hole 71*a*. Therefore, even when being inserted into the rotation through-hole 71*a*, the rubber plug 5 is stuck on a step between the main hole portion 71*a*4 and the small portion 71*a*3 and does not come off from the rotation through-hole 71*a*. In this embodiment, the small portion 71*a*3 occupies about a half of a portion, of the rotation through-hole 71*a*, other than the main hole portion 71*a*4, in other words, about a half of a portion, of the rotation through-hole 71*a*, on the side of the second end 71*a*2. As shown in FIG. 6, the rubber plug 5 inserted into the rotation through-hole 71*a* is stopped, by the small portion 71*a*3, at a central portion of the rotation through-hole 71*a* in the axial direction thereof. The small portion 71*a*3 merely needs to be structured to stop the rubber plug 5, inserted into the rotation through-hole 71*a*, at the central portion of the rotation through-hole 71*a* in the axial direction thereof. The border between the small portion 71*a*3 and the main hole portion 71*a*4 does not need to be at the central portion of the rotation through-hole 71*a* in the axial direction thereof, in the case where the rubber plug 5 has a certain shape.

As described below in detail, while the rubber plug 5 is dispatched from the rotation through-hole 71*a* by the dispatch device 90, the small portion 71*a*3 allows the rubber plug 5 to pass through the rotation through-hole 71*a* in a deformed state. When being provided with a certain degree of dispatch force by the dispatch device 90, the rubber plug 5 passes through the small portion 71*a*3 in an elastically deformed state.

The rotation shaft 72 of the orientation change device 70 extends in a direction perpendicular to the axial direction of the rotation through-hole 71*a*, specifically, in this embodiment, in the front-rear direction. The rotation driving portion 73 rotates the rotatable body 71 about the rotation shaft 72. In this embodiment, the rotatable body 71 is driven by the rotation driving portion 73 to rotate clockwise or counterclockwise as seen from the front side. The rotation driving portion 73 is electrically connected with, and is controlled by, the controller 100. The rotation driving portion 73 is capable of moving the rotatable body 71 to a predetermined rotation position in accordance with an instruction from the controller 100. The rotation driving portion 73 includes, for example, a servo motor. It should be noted that there is no specific limitation on the structure of the rotation driving portion 73.

The dispatch device 90 dispatches the rubber plug 5, adjusted to be in the normal orientation, to another device. In the case where the orientation of the rubber plug 5 detected by the orientation detection sensor 32 is the normal orientation, the dispatch device 90 dispatches the rubber plug 5 from the first through-hole 51. In the case where the orientation of the rubber plug 5 detected by the orientation detection sensor 32 is the reverse orientation and the orientation of the rubber plug 5 is changed by the orientation correction device 40, the dispatch device 90 dispatches the rubber plug 5 from the rotation through-hole 71*a* of the rotatable body 71.

As shown in FIG. 5, the dispatch device 90 includes the dispatch tube 91, a first injection portion 92, a second injection portion 93, and a passage confirmation sensor 94. The dispatch tube 91 is a dispatch passage for the rubber plug 5 that is in communication with the rotation through-hole 71*a* of the rotatable body 71 and allows the rubber plug 5 to pass therethrough. As described above, the dispatch tube 91 is provided above the rotatable body 71 and the movable body 50, and is in communication with the rotation through-hole 71*a* via the first through-hole 51 (in the case where the movable body 50 is at the dispatch position Pt) or the second through-hole 52 (in the case where the movable body 50 is at the receiving position Pr; see FIG. 1). The first injection portion 92 is connected with the rotation through-hole 71*a*, and injects air in the dispatch direction of the rubber plug 5. As shown in FIG. 5, the first injection portion 92 is provided below the rotatable body 71, and is connected with the rotation through-hole 71*a* from below. The first injection portion 92 injects the air upward. The first injection portion 92 includes a first injection valve 92*a*. The first injection valve 92*a* is, for example, a solenoid valve. When the first injection valve 92*a* is opened, compressed air is injected into the rotation through-hole 71*a*.

The second injection portion 93 is connected with the dispatch tube 91, and injects air in the dispatch direction of the rubber plug 5, specifically, in this embodiment, upward. As shown in FIG. 5, the second injection portion 93 is provided downstream with respect to the insertion device 80 in the dispatch direction. The second injection portion 93 includes an injection flow path 93*a* and a second injection valve 93*b*. The injection flow path 93*a* extends obliquely upward from the outer circumferential surface of the dispatch tube 91, and a tip of the injection flow path 93*a* is in communication with the dispatch tube 91. The second injection valve 93*b* is, for example, a solenoid valve. When the second injection valve 93*b* is opened, compressed air is injected into the dispatch tube 91. This compressed air is injected downstream in the dispatch direction. The second injection portion 93 injects the air, and as a result, a portion of the dispatch tube 91 upstream with respect to the second injection portion 93 is decreased in the pressure. This pulls the rubber plug 5 toward the second injection portion 93. The injection of the air by the second injection portion 93 also forms a downstream flow of the air in a portion of the dispatch tube 91 downstream in the dispatch direction with respect to the second injection portion 93. This flow of the air dispatches the rubber plug 5 to the outside of the rubber plug supply apparatus 10.

The passage confirmation sensor 94 detects that the rubber plug 5 has passed a connection point 91*a*, of the dispatch tube 91, at which the dispatch tube 91 is connected with the second injection portion 93. In this embodiment, the passage confirmation sensor 94 is an optical sensor. The passage confirmation sensor 94 is provided downstream in the dispatch direction with respect to the connection point 91a of the dispatch tube 91 with the second injection portion 93. The passage confirmation sensor 94 emits light having an optical axis passing through the dispatch tube 91, and detects that the rubber plug 5 has passed the position of the optical axis by the light being blocked. It should be noted that there is no specific limitation on the system used by the passage confirmation sensor 94.

Figure 7:
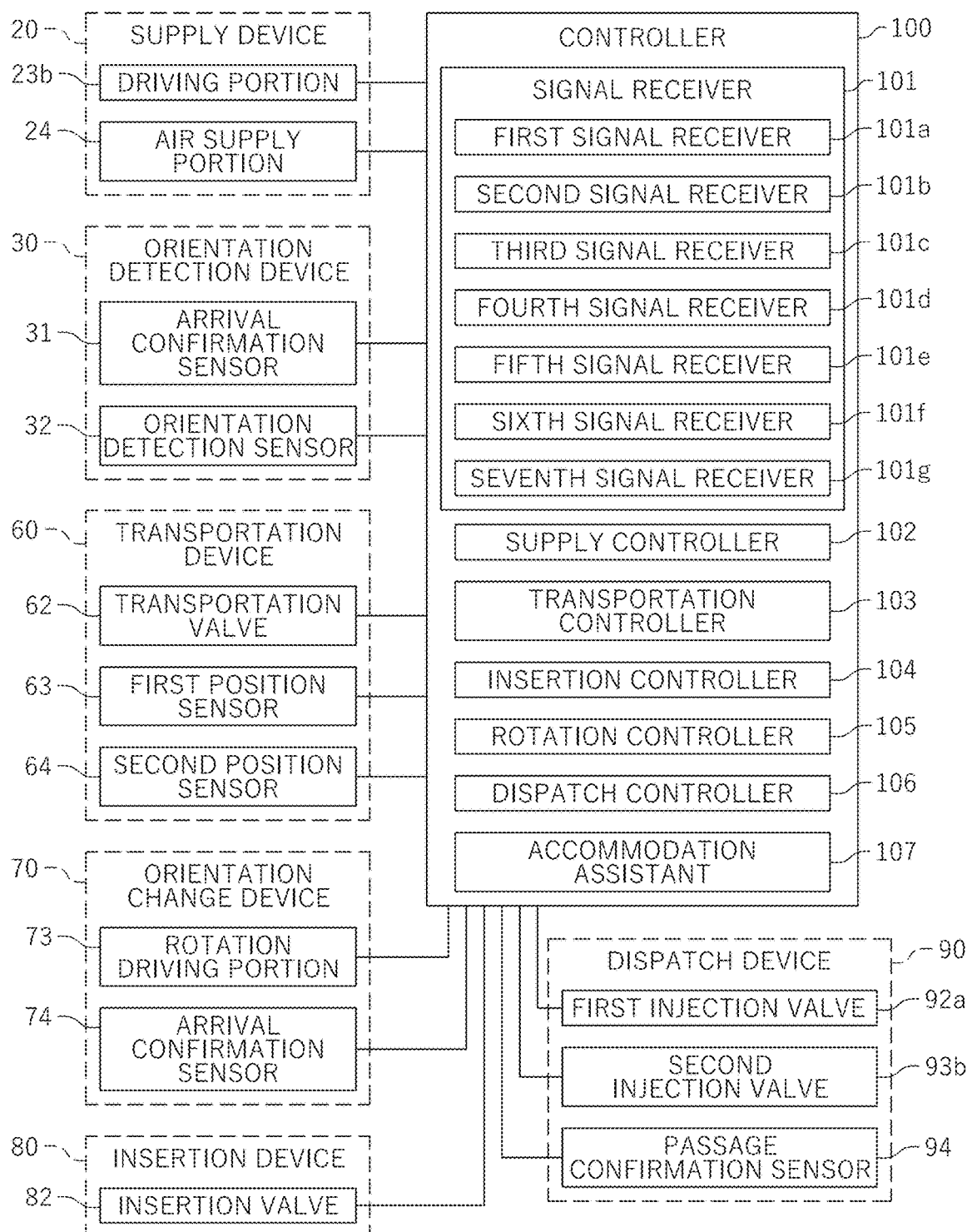
FIG. 7 is a block diagram of the rubber plug supply apparatus.

FIG. 7 is a block diagram of the rubber plug supply apparatus 10 according to this embodiment. As shown in FIG. 7, the controller 100 is connected with the driving portion 23b and the air supply portion 24 of the supply device 20, the arrival confirmation sensor 31 and the orientation detection sensor 32 of the orientation detection device 30, the transportation valve 62, the first position sensor 63 and the second position sensor 64 of the transportation device 60, the rotation driving portion 73 and the arrival confirmation sensor 74 of the orientation change device 70, the insertion valve 82 of the insertion device 80, and the first injection valve 92a, the second injection valve 93b and the passage confirmation sensor 94 of the dispatch device 90. The controller 100 controls the operations of the driving portion 23b, the air supply portion 24, the transportation valve 62, the rotation driving portion 73, the insertion valve 82, the first injection valve 92a and the second injection valve 93b. The controller 100 receives signals from the arrival confirmation sensor 31, the orientation detection sensor 32, the first position sensor 63, the second position sensor 64, the arrival confirmation sensor 74 and the passage confirmation sensor 94. Although not shown, the controller 100 receives an arrival signal of the rubber plug 5 from the device as a dispatch destination of the rubber plug 5.

There is no specific limitation on the structure of the controller 100. The controller 100 may include, for example, a central processing unit (hereinafter, referred to as a "CPU"), a ROM storing, for example, a program to be executed by the CPU, a RAM, and the like. Each of the components of the controller 100 may be formed by software or hardware. Each of the components of the controller 100 may be a processor or a circuit.

As shown in FIG. 7, the controller 100 includes a signal receiver 101, a supply controller 102, a transportation controller 103, an insertion controller 104, a rotation controller 105, a dispatch controller 106, and an accommodation assistant 107.

The signal receiver 101 receives signals from the sensors. The signal receiver 101 includes a first signal receiver 101a, a second signal receiver 101b, a third signal receiver 101c, a fourth signal receiver 101d, a fifth signal receiver 101e, a sixth signal receiver 101f, and a seventh signal receiver 101g. The first signal receiver 101a receives a signal from the arrival confirmation sensor 31. It is confirmed by the signal from the arrival confirmation sensor 31 that the rubber plug 5 supplied from the supply device 20 has been accommodated in the first through-hole 51. The second signal receiver 101b receives a signal from the orientation detection sensor 32. The orientation of the rubber plug 5 supplied from the supply device 20 is confirmed by the signal from the orientation detection sensor 32. The third signal receiver 101c receives a signal from the first position sensor 63. It is confirmed by the signal from the first position sensor 63 that the movable body 50 is at the receiving position Pr. The fourth signal receiver 101d receives a signal from the second position sensor 64. It is confirmed by the signal from the second position sensor 64 that the movable body 50 is at the dispatch position Pt. The fifth signal receiver 101e receives a signal from the arrival confirmation sensor 74. It is confirmed by the signal from the arrival confirmation sensor 74 that the rubber plug 5 has been accommodated in the rotation through-hole 71a of the rotatable body 71. The sixth signal receiver 101f receives a signal from the passage confirmation sensor 94. It is confirmed by the signal from the passage confirmation sensor 94 that the rubber plug 5 has passed the connection point 91a of the dispatch tube 91 with the second injection portion 93. The seventh signal receiver 101g receives an arrival signal of the rubber plug 5 from the device as the dispatch destination of the rubber plug 5.

The supply controller 102 controls the operations of the supply tank moving portion 23 and the air supply portion 24. The supply controller 102 controls the driving portion 23b of the supply tank moving portion 23 to cause a reciprocating motion of the hopper portion 21b of the accommodation tank 21 in the up-down direction. The supply controller 102 also controls the air supply portion 24 to send air into the accommodation tank 21.

The transportation controller 103 controls the transportation device 60 to move the movable body 50. As a result, the rubber plug 5 is transported from the supply device 20 to the orientation change device 70 or the dispatch device 90. In the case where the orientation of the rubber plug 5 needs to be inverted, the insertion controller 104 controls the insertion device 80 to push the rubber plug 5 into the rotation through-hole 71a of the rotatable body 71. In the case where the orientation of the rubber plug needs to be inverted, the rotation controller 105 controls the rotation driving portion 73 to rotate the rotatable body 71. The dispatch controller 106 controls the dispatch device 90 to dispatch the rubber plug 5 to the device as the dispatch destination. These controls will be described below in detail.

The accommodation assistant 107 controls the transportation device 60 to assist the transfer of the rubber plug 5 from the discharge port 22b of the supply tube 22 to the first through-hole 51 of the movable body 50. As described below in detail, in a process of accommodating the rubber plug 5 into the first through-hole 51, the accommodation assistant 107 drives the transportation device 60 to move the first through-hole 51, and thus to move the position of the first through-hole 51 with respect to the discharge port 22b among a position directly facing the discharge port 22b, a position slightly shifted leftward from the directly facing position, and a position slightly shifted rightward from the directly facing position. The accommodation assistant 107 repeats the movement of the first through-hole 51 among the above-mentioned three positions. In other words, the accommodation assistant 107 causes a reciprocating motion of the movable body 50 in the left-right direction, with the center of the motion being the position of the movable body 50 at which the first through-hole 51 directly faces the discharge port 22b (namely, with the center of the motion being the receiving position Pr of the movable body 50). In this embodiment, the accommodation assistant 107 repeats the movement of the first through-hole 51 among the above-mentioned three positions until it is confirmed by the signal from the arrival confirmation sensor 31 that the rubber plug 5 has been accommodated in the first through-hole 51. Hereinafter, the reciprocating motion of the movable body 50 in the left-right direction will be referred to also as the "swing motion". The swing motion will be described below in detail.

[Supply Process]

Figure 8:
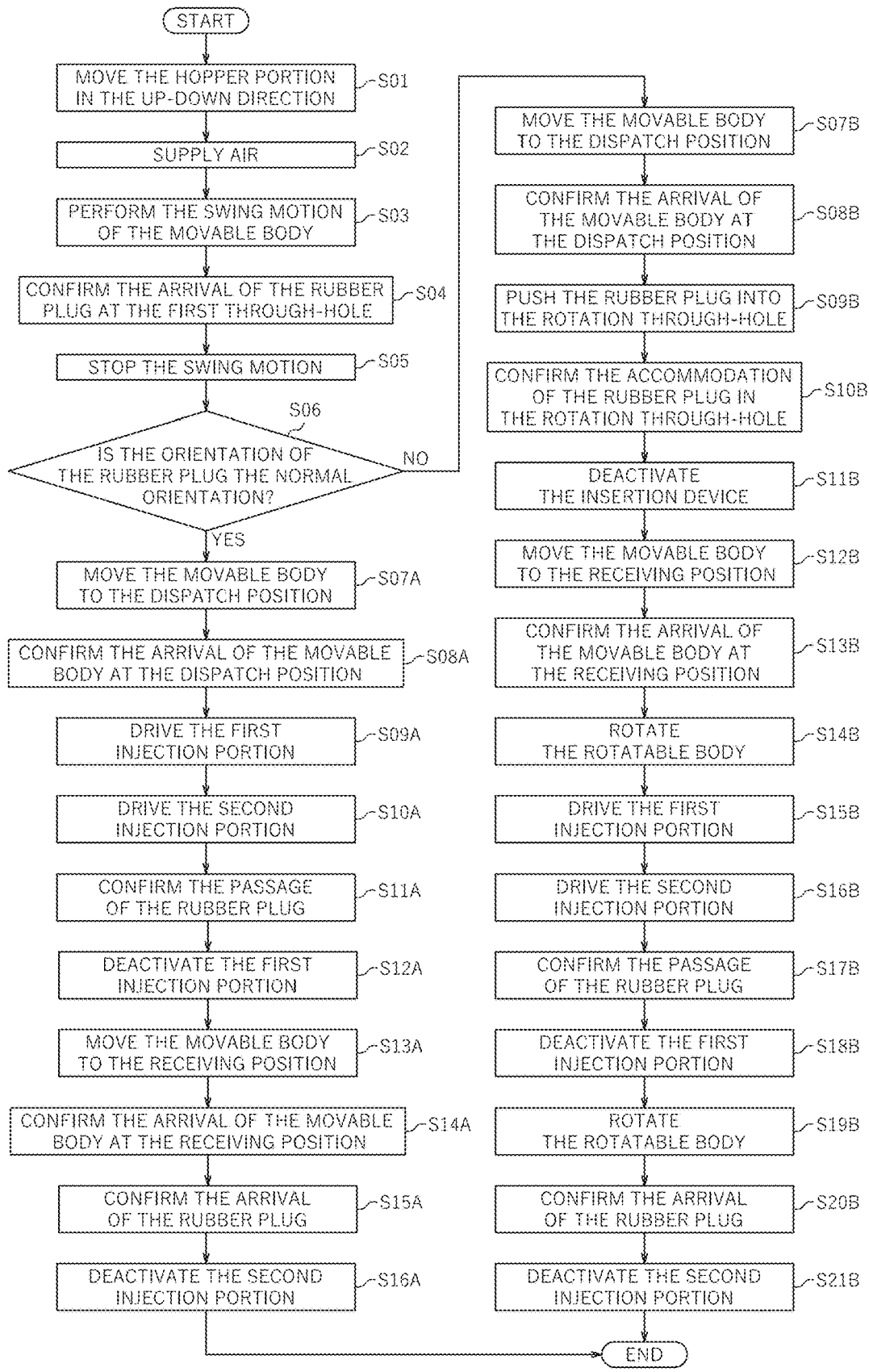
FIG. 8 is a flowchart of supply of the rubber plug.

Hereinafter, a supply process of supplying the rubber plug 5 by the rubber plug supply apparatus 10 will be described. FIG. 8 is a flowchart of supply of the rubber plug 5. It should be noted that the process shown in the flowchart of FIG. 8 is merely an example and does not limit the supply process of the rubber plug 5. This is also applicable to the other processes described below. As shown in FIG. 8, in step S01 of the supply process of the rubber plug 5, the hopper portion 21b of the accommodation tank 21 starts moving in the up-down direction. In step S02, the air supply portion 24 starts supplying air. Steps S01 and S02 may be kept performed while the rubber plugs are supplied sequentially. At the time when the supply process of the rubber plug 5 is started as shown in FIG. 1, the movable body 50 is at the receiving position Pr, and the rotatable body 71 is at such a rotation position that the first end 71a1 is directed upward.

The movement of the hopper portion 21b in the up-down direction in step S01 assists the rubber plug 5 in the accommodation tank 21 in entering the supply tube 22. The supply of the air into the accommodation tank 21 in step S02 assists the rubber plug 5 in the accommodation tank 21 in entering the supply tube 22, assists the rubber plug 5 in moving in the supply tube 22 toward the discharge port 22b, and assists the rubber plug 5 in being accommodated into the first through-hole 51 of the movable body 50.

Figure 9:
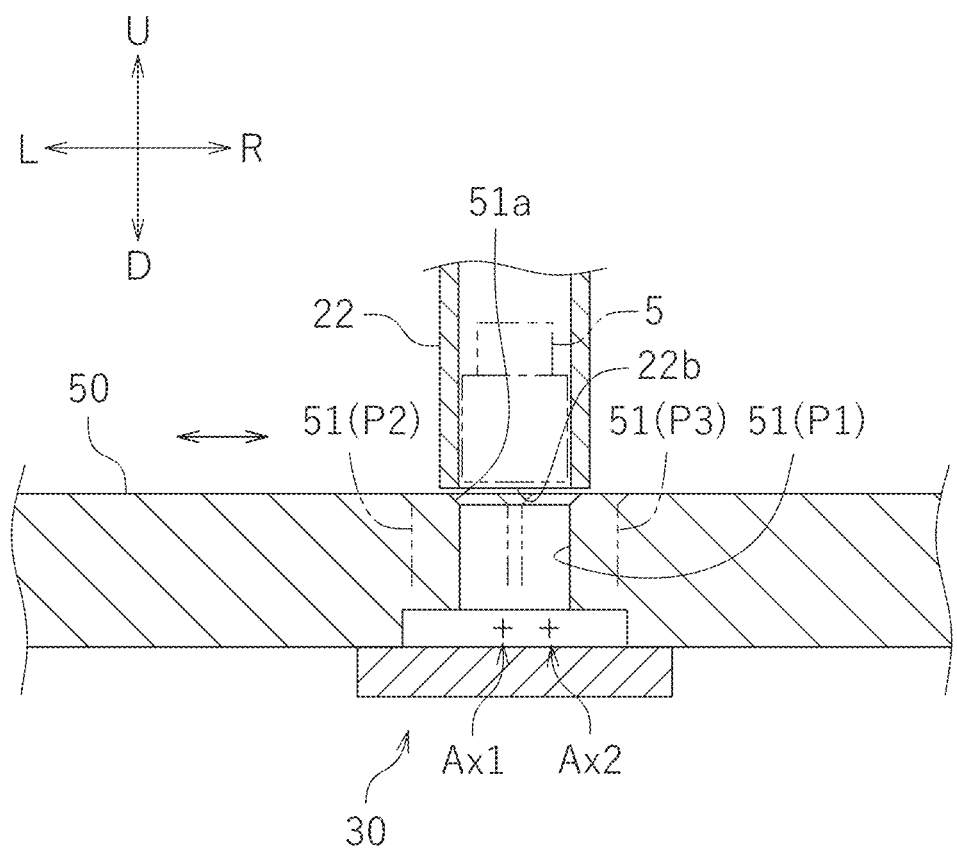
FIG. 9 is a schematic view showing a swing motion.

In step S03, the swing motion of the movable body 50 is started. FIG. 9 is a schematic view showing the swing motion. As shown in FIG. 9, according to the swing motion of the movable body 50, the position of the first through-hole 51 with respect to the discharge port 22b is moved among a directly facing position P1, a left position P2 and a right position P2. The directly facing position P1 is a position at which the first through-hole 51 directly faces the discharge port 22b. The directly facing position P1 corresponds to the receiving position Pr (see FIG. 1) of the movable body 50. The left position P2 is shifted from the directly facing position P1, and is a position at which the first through-hole 51 partially faces the discharge port 22b. In this embodiment, the left position P2 is slightly shifted leftward from the directly facing position P1, such that the first through-hole 51 faces a part of the discharge port 22b. A right position P3 is set to be symmetrical to the left position P2 with respect to the directly facing position P1. Herein, the term "symmetrical" is not limited to referring to a position completely symmetrical, and encompasses a position that may be referred to as being substantially symmetrical. For example, the right position P3 may be a position at which the first through-hole 51 faces a part of the discharge port 22b on the side opposite to the left position P2 with respect to the directly facing position P1. In this embodiment, the right position P3 is slightly shifted rightward from the directly facing position P1, such that the first through-hole 51 faces a part of the discharge port 22b. In step S03, the movement of the first through-hole 51 among the directly facing position P1, the left position P2 and the right position P3 is repeated by a reciprocating motion of the movable body 50 in the left-right direction caused by the transportation device 60. Steps S01 through S03 may be performed in any order or may be performed at the same time.

Such a swing motion of the movable body 50 assists the rubber plug 5 in being accommodated into the first through-hole 51. In this embodiment, the rubber plug 5 moves from the inside of the supply tube 22 to the inside of the first through-hole 51 by an action of gravity and the pressurization by the air supply portion 24. However, the rubber plug 5 is not necessarily moved into the first through-hole 51 smoothly. There is a case where the rubber plug 5 is stuck at, for example, the top end of the first through-hole 51 while being supplied into the first through-hole 51. For example, in the case where the chamfered portion 51a is not formed in a sufficiently large area and thus the top end of the first through-hole 51 is jagged, or in the case where the top end of the first through-hole 51 is not chamfered, this tendency is conspicuous. Even if the rubber plug 5 is stuck in this manner, the rubber plug supply apparatus 10 according to this embodiment solves such a stuck state of the rubber plug 5 by the swing motion of the movable body 50. In the case where the swing motion is not performed, there is an undesirable possibility that the rubber plug 5 is inclined, by the chamfered portion 51a, with respect to an axial direction of the supply tube 22 and the first through-hole 51 and as a result, is rather put on the chamfered portion 51a easily. In the case where the swing motion is performed, the chamfered portion 51a acts, with more certainty, to make it difficult for the rubber plug 5 to be stuck at the top end of the first through-hole 51. After a front end of the rubber plug 5 in the advancing direction enters the first through-hole 51, the rubber plug 5 is accommodated into the first through-hole 51 by the pressurization by the air supply portion 24.

In step S04, it is confirmed based on the signal from the arrival confirmation sensor 31 that the rubber plug 5 has been accommodated in the first through-hole 51 of the movable body 50. Upon confirmation in step S04 that the rubber plug 5 has been accommodated in the first through-hole 51 of the movable body 50, the swing motion of the movable body 50 is stopped in step S05. Next in step S06, the orientation of the rubber plug 5 in the first through-hole 51 is checked. In the following, first, the case where the orientation of the rubber plug 5 is the normal orientation (the case of YES in step S06) will be described, and then the case where the orientation of the rubber plug 5 is the reverse orientation (the case of NO in step S06) will be described.

[In the Case where the Orientation of the Rubber Plug is the Normal Orientation]

In the case where the orientation of the rubber plug 5 in the first through-hole 51 is the normal orientation (in the case of YES in step S06), in step S07A performed after step S06, the movable body 50 is moved to the dispatch position Pt. As shown in FIG. 5, as a result of this movement of the movable body 50, the first through-hole 51 and the dispatch tube 91 are put into communication with each other. In step S08A, it is confirmed based on the signal from the second position sensor 64 that the movable body 50 has arrived at the dispatch position Pt.

Next in step S09A, air is injected from the first injection portion 92. In step S10A, air is injected from the second injection portion 93. A dispatch force generated by the injections of the air causes the rubber plug 5, held in the first through-hole 51, to come off from the first through-hole 51 and to be sent to the dispatch tube 91. The rubber plug 5 passing through the dispatch tube 91 is accelerated by the injection of the air by the second injection portion 93 at, or in the vicinity of, the connection point 91a between the second injection portion 93 and the dispatch tube 91. Steps S09A and S10A may be performed in the opposite order or may be performed at the same time.

In step S11A, it is confirmed based on the signal from the passage confirmation sensor 94 that the rubber plug 5 has passed the connection point 91a between the second injection portion 93 and the dispatch tube 91. In step S12A, the first injection portion 92, the role of which is finished as a result of the rubber plug 5 passing the connection point 91a, is deactivated. After this, the rubber plug 5 is carried to the device as the dispatch destination by the action of the second injection portion 93. In step S13A, the movable body 50 is moved to the receiving position Pr. In step S14A, it is confirmed based on the signal from the first position sensor 63 that the movable body 50 has arrived at the receiving position Pr. Steps S12A and S13A may be performed at the same time.

In step S15A, it is confirmed based on the arrival signal from the device as the dispatch destination that the rubber plug 5 has arrived at the device as the dispatch destination. Upon confirmation in step S15A that the rubber plug 5 has arrived at the device as the dispatch destination, in step S16A, the second injection portion 93 is deactivated. Thus, the supply of one rubber plug 5 is finished.

[In the Case where the Orientation of the Rubber Plug is the Reverse Orientation]

In the case where the orientation of the rubber plug 5 in the first through-hole 51 is the reverse orientation (in the case of NO in step S06), in step S07B performed after step S06, the movable body 50 is moved to the dispatch position Pt. In step S08B, it is confirmed based on the signal from the second position sensor 64 that the movable body 50 has arrived at the dispatch position Pt. In this embodiment, steps S07B and S08B are the same as steps S07A and S08A respectively. As shown in FIG. 5, as a result of this movement of the movable body 50, the first through-hole 51 and the rotation through-hole 71a of the rotatable body 71 are put into communication with each other. Also as a result of this movement of the movable body 50, the first through-hole 51 and the insertion device 80 are connected with each other.

As shown in FIG. 8, next in step S09B, the rubber plug 5 is pushed into the rotation through-hole 71a of the rotatable body 71 by the insertion device 80. The rubber plug 5, which has come off from the first through-hole 51 by the force of the air sent by the insertion device 80, drops into the rotation through-hole 71a. In this embodiment, the diameter of the main hole portion 71a4 forming the top portion of the rotation through-hole 71a is longer than the diameter of the rubber plug 5. Therefore, the rubber plug 5 drops with no resistance by an inner side surface of the main hole portion 71a4. As shown in FIG. 6, the rubber plug 5, which has dropped into the rotation though-hole 71a, is on the step between the main hole portion 71a4 and the small portion 71a3, and stops at the central portion of the rotation though-hole 71a. In step S10B, it is confirmed based on the signal from the arrival confirmation sensor 74 that the rubber plug 5 has been accommodated in the rotation through-hole 71a of the rotatable body 71. Upon confirmation in step S10B that the rubber plug 5 has been accommodated in the rotation through-hole 71a, in step S11B, the insertion device 80 is deactivated.

Next in step S12B, the movable body 50 is moved to the receiving position Pr. Since the rubber plug 5 is confirmed in step S10B to have been accommodated in the rotation through-hole 71a, it is confirmed that such a movement of the movable body 50 causes no problem. In step S13B, it is confirmed based on the signal from the first position sensor 63 that the movable body 50 has arrived at the receiving position Pr. As shown in FIG. 1, as a result of the movable body 50 arriving at the receiving position Pr, the rotation through-hole 71a, the second through-hole 52 and the dispatch tube 91 are put into communication with each other.

Figure 10:
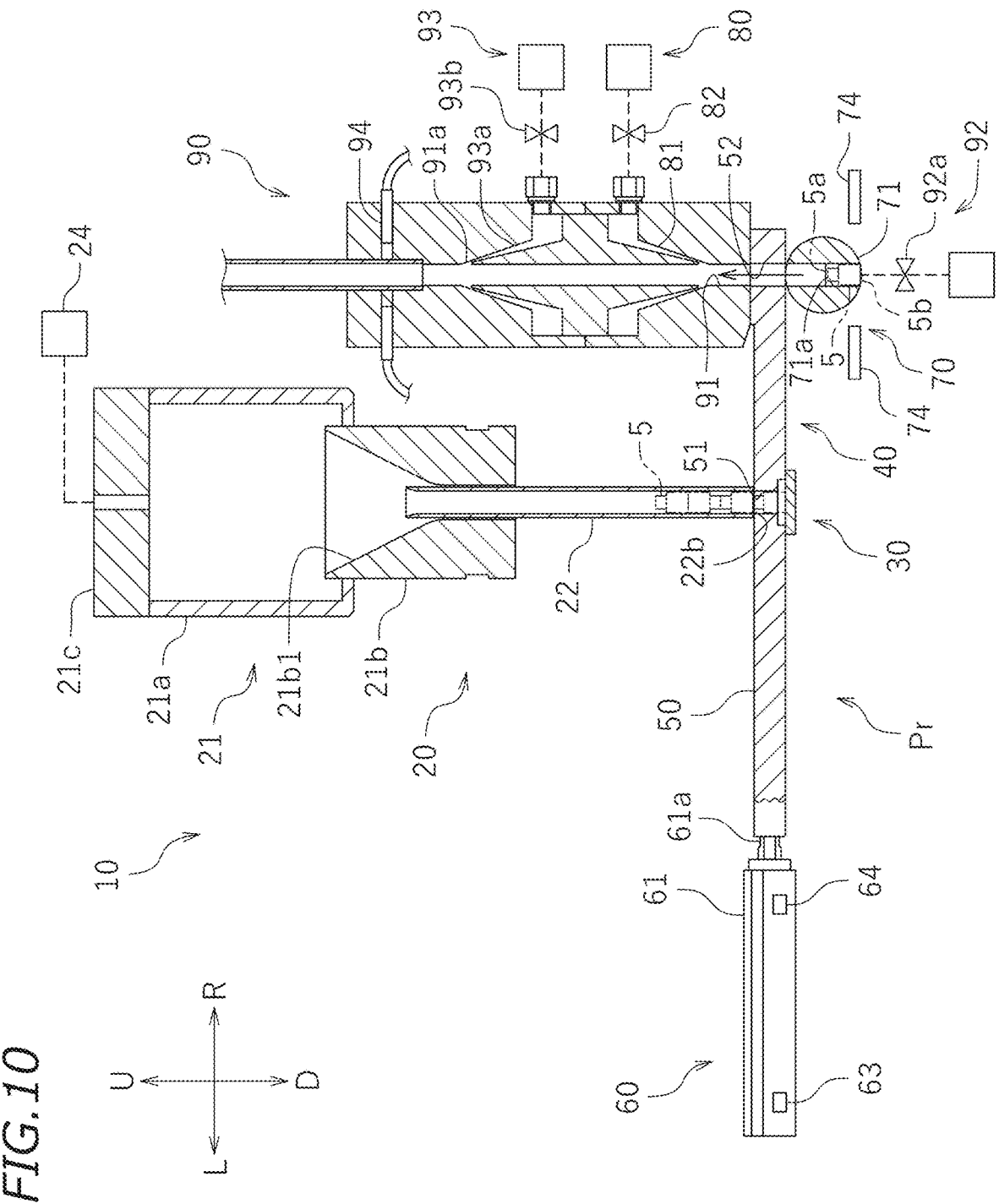
FIG. 10 is a partial cross-sectional view schematically showing the rubber plug supply apparatus after the orientation of the rubber plug is changed.

In step S14B, the rotatable body 71 is rotated about the rotation shaft 72 by 180 degrees. This corrects the orientation of the rubber plug 5 to the normal orientation. FIG. 10 is a partial cross-sectional view schematically showing the rubber plug supply apparatus 10 after the orientation of the rubber plug 5 is changed. As shown in FIG. 10, after step S14B is finished, the orientation of the rubber plug 5 is corrected such that the front end 5a is directed forward in the dispatch direction (in this embodiment, directed upward).

During the rotation of the rotatable body 71 in step S14B, the rubber plug 5 is located at the central portion of the rotation through-hole 71a of the rotatable body 71. Therefore, the rubber plug 5 is not much supplied with a centrifugal force generated by the rotation of the rotatable body 71 (a centrifugal force to move the rubber plug 5 toward the first end 71a1 and a centrifugal force to move the rubber plug 5 toward the second end 71a2 substantially cancel each other). Therefore, there is no undesirable possibility that the rubber plug 5 jumps out of the rotation through-hole 71, and thus the rotatable body 71 is allowed to rotate at a high speed. In this embodiment, in step S14B, the rotatable body 71 is rotated at a relatively high speed at which the rubber plug does not jump out of the rotatable body 71.

While step S14B is performed, the step of accommodating the next rubber plug into the first through-hole 51 (corresponding to steps S01 and S02; the swing motion of the movable body 50 is not performed) is started. This may possibly shorten the time period required to supply the next rubber plug 5. It should be noted that steps S14B and S12B may be performed in the opposite order or may be performed at the same time.

In step S15B, air is injected from the first injection portion 92. In step S16B, air is injected from the second injection portion 93. A dispatch force generated by these injections of the air causes the rubber plug 5 to pass through the small portion 71a3 in a deformed state. As represented by the arrow in FIG. 10, the rubber plug 5 comes off from the rotation through-hole 71a and is sent to the dispatch tube 91 via the second through-hole 52. Steps S15B and S16B may be performed in the opposite order or may be performed at the same time.

In step S17B, it is confirmed based on the signal from the passage confirmation sensor 94 that the rubber plug 5 has passed the connection point 91a between the second injection portion 93 and the dispatch tube 91. In step S18B, the first injection portion 92 is deactivated upon confirmation in step S17B. In step S19B, upon confirmation in step S17B, the rotatable body 71 is rotated by 180 degrees to return to the rotation position thereof at the start of the process. In step S20B, it is confirmed based on the arrival signal dispatched from the device as the dispatch destination that the rubber plug has arrived at the device as the dispatch destination. Steps S18B and S19B may be performed in the opposite order or may be performed at the same time.

Upon confirmation in step S20B that the rubber plug 5 has arrived at the device as the dispatch destination, in step S21B, the second injection portion 93 is deactivated. Thus, the supply of one rubber plug 5 is finished. The rubber plug supply apparatus repeats the above-described process to keep dispatching the rubber plugs 5 to the device as the dispatch destination.

[Function of the Slit]

Now, the function of the slit 22c provided in the supply tube 22 will be described. In this embodiment, the rubber plug 5 moves into the supply tube 22, passes through the supply tube 22 and is pushed into the first through-hole 51 with an assistance of the air supplied by the air supply portion 24. When one rubber plug 5 is carried in the supply tube 22 and arrives at the discharge port 22b, the rubber plug 5 closes the most part of the discharge port 22b.

In the case where the slit 22c is not provided, the discharge port 22b is closed, and the air from the air supply portion 24 with no exit leaks through a gap in the supply device 20. Before the rubber plug 5 closes the most part of the discharge port 22b, the air from the air supply portion 24 flows toward the discharge port 22b of the supply tube 22, and this flow of the air assists the rubber plug 5 in moving. If the rubber plug 5 closes the most part of the discharge port 22b, the amount of the air in such a flow is significantly decreased. This reduces the ability of assisting the supply of the rubber plug 5 to the movable body 50. Even if the air does not leak through the gap in the supply device 20, the amount of the air flowing toward the discharge port 22b of the supply device 20 is decreased, and the ability of assisting the supply of the rubber plug to the movable body 50 is reduced.

In other words, since the rubber plug 5 is carried to the supply tube 22 by a difference between the air pressure in the accommodation tank 21 and the air pressure in the supply tube 22, the ability of the air supply portion 24 of carrying the rubber plug to the supply tube 22 is not exhibited unless the air is discharged from at least the supply tube 22. Preferably, the air is discharged at, or in the vicinity of, the discharge port 22b of the supply tube 22. This is advantageous to assist the rubber plug 5 in moving in the supply tube 22.

Under such circumstances, in this embodiment, the slit 22c is formed in the supply tube 22. The air supplied by the air supply portion 24 is discharged from the slit 22c, and as a result, the air pressure in the supply tube 22 is made lower than the air pressure in the accommodation tank 21. This suppresses the reduction in the ability of the air supply portion 24 of carrying the rubber plug 5 to the supply tube 22. In the case where the slit 22c is provided closer to the discharge port 22b than the middle portion of the supply tube 22, the reduction in the ability of the air supply portion 24 of moving the rubber plug 5 in the supply tube 22 is also suppressed. In particular, in the case where the slit 22c is formed so as to reach the end of the supply tube 22 on the side where the discharge port 22b is formed (in this embodiment, to reach the bottom end of the supply tube 22), the reduction in the ability of the air supply portion 24 of moving the rubber plug 5 in the supply tube 22 is suppressed more effectively.

The provision of the slit 22c also allows the air pressure in the supply tube 22 to be adjusted to an appropriate level. Unless an opening such as the slit 22c or the like is formed in the supply tube 22 to intentionally discharge the air, the pressure in the supply tube 22 becomes too high and as a result, for example, the rubber plug 5 may be undesirably deformed. The slit 22c allows the pressure in the supply tube 22 to be maintained at an appropriate level regardless of the state of the rubber plug 5 in the supply tube 22.

[Coupled Rubber Plugs Separation Motion]

In the case where a plurality of rubber plugs 5 of a certain type are located in a line in the supply tube 22, one of a preceding rubber plug (referred to as a "rubber plug 5-1; see FIG. 11A through FIG. 11C) and a subsequent rubber plug (referred to as a "rubber plug 5-2; see FIG. 11A through FIG. 11C) may possibly be inserted into the other, and as a result, these rubber plugs 5-1 and 5-2 may possibly be coupled with each other. In the case where such rubber plugs 5 are supplied, the rubber plug supply apparatus 10 according to this embodiment additionally performs a swing motion of the movable body 50 that will be referred to as a "coupled rubber plugs separation motion" below. The coupled rubber plugs separation motion is added, for example, after step S06 in FIG. 8 (checking of the orientation of the rubber plug 5).

Figure 11A:
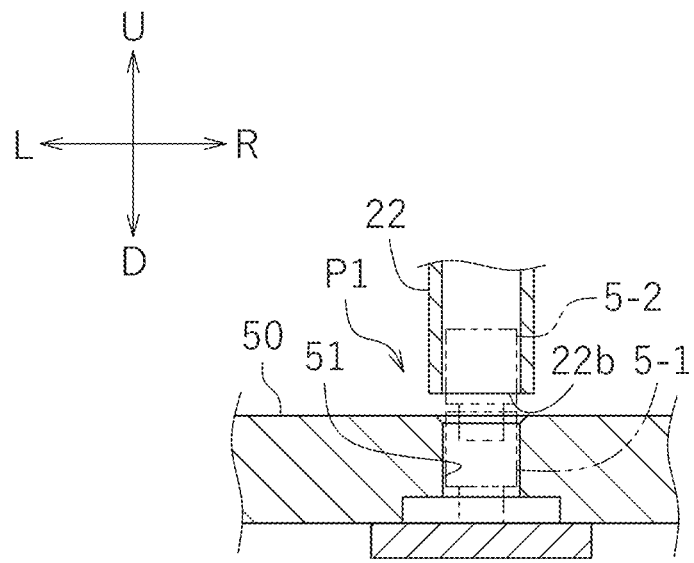
FIG. 11A is a schematic view showing a coupled rubber plugs separation motion.
Figure 11B:
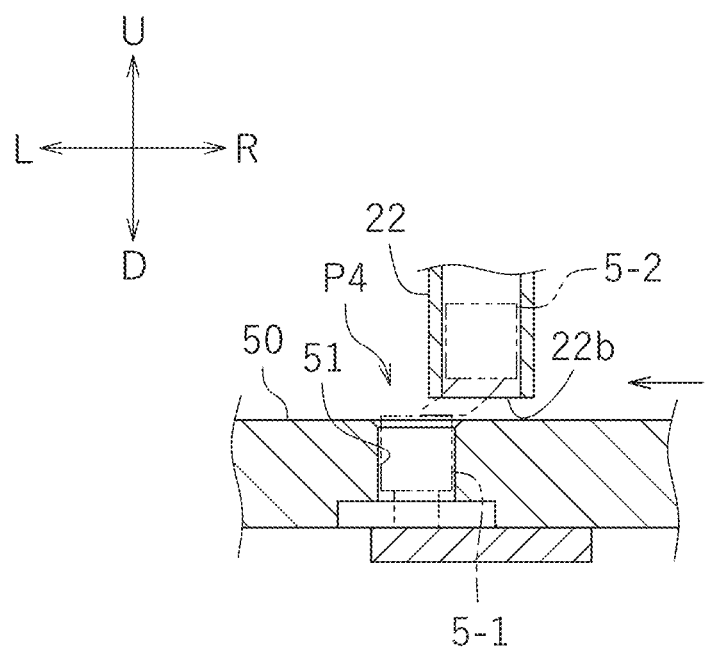
FIG. 11B is a schematic view showing the coupled rubber plugs separation motion.
Figure 11C:
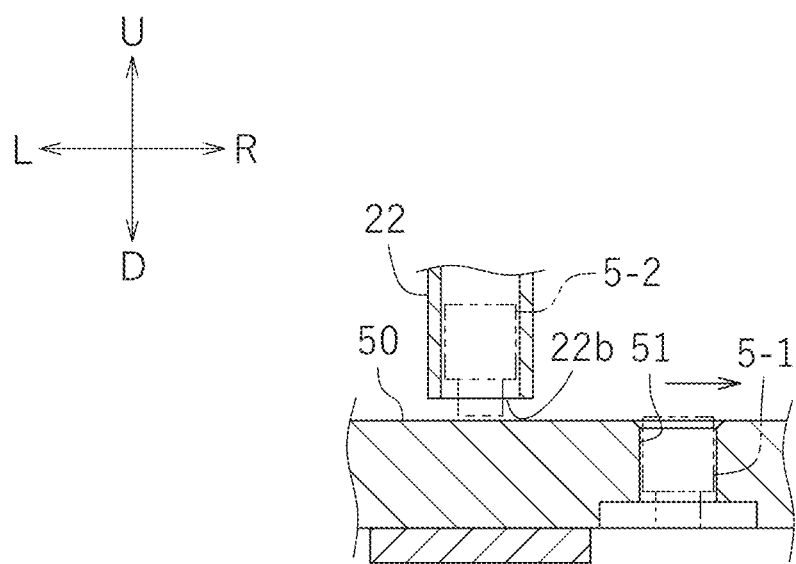
FIG. 11C is a schematic view showing the coupled rubber plugs separation motion.

FIG. 11A through FIG. 11C are schematic views showing the coupled rubber plugs separation motion. As shown in FIG. 11A through FIG. 11C, according to the coupled rubber plugs separation motion of the movable body 50, the position of the first through-hole 51 with respect to the discharge port 22b is moved between the directly facing position P1 (see FIG. 11A) and a left position P4 (see FIG. 11B). As shown in FIG. 11B, the left position P4 is shifted from the directly facing position P1, and is a position at which the first through-hole 51 faces a part of the discharge port 22b. In this embodiment, the left position P4 is slightly shifted from the directly facing position P1, such that the first through-hole 51 faces a part of the discharge port 22b. The direction of the left position P4 with respect to the directly facing position P1 is opposite to the direction of the dispatch position Pt with respect to the directly facing position P1 (receiving position Pr).

The left position P4 may be the same as, or different from, the left position P2 mentioned above. In the coupled rubber plugs separation motion, the movement of the first through-hole 51 from the directly facing position P1 to the left position P4 is performed only once by the transportation device 60. As shown in FIG. 11A and FIG. 11B, the movable body 50 moves leftward such that the first through-hole 51 is moved from the directly facing position P1 to the left position P4. Then, as shown in FIG. 11C, the movable body 50 moves rightward toward the dispatch position Pt.

As shown in FIG. 11A, there may be a case where the two rubber plugs 5-1 and 5-2 are coupled with each other before the coupled rubber plugs separation motion is performed. In this case, the preceding rubber plug 5-1 is appropriately accommodated in the first through-hole 51 of the movable body 50. However, a part of the subsequent rubber plug 5-2 is also accommodated in the first through-hole 51. There may possibly be a case where as a result of being coupled with the subsequent rubber plug 5-2, the preceding rubber plug 5-1 is not appropriately accommodated in the first though-hole 51. Unless the coupled rubber plug separation motion is performed in this state, the movable body 50 may undesirably be moved to the dispatch position Pt while a bottom end of the subsequent rubber plug 5-2 is held in a gap between the bottom end of the supply tube 22 and the movable body 50. This increases the undesirable possibility that the subsequent rubber plug 5-2 is damaged.

When the coupled rubber plugs separation motion is performed in the state of FIG. 11A, as shown in FIG. 11B, the first through-hole 51 is moved from the directly facing position P1 to the left position P4 and as a result, the subsequent rubber plug 5-2 is separated from the preceding rubber plug 5-1 while being held in the gap between the bottom end of the supply tube 22 and the movable body 50. The usual swing motion is performed until the rubber plug 5 drops into the first through-hole 51. By contrast, the coupled rubber plugs separation motion is performed until the preceding rubber plug 5-1 and the subsequent rubber plug 5-2 are separated from each other as described above. After this, even if the movable body 50 is moved rightward as shown in FIG. 11C, there is almost no possibility that the subsequent rubber plug 5-2 is coupled with the preceding rubber plug 5-1 because the preceding rubber plug 5-1 has been moved. Therefore, such a coupled rubber plugs separation motion allows the preceding rubber plug 5-1 and the subsequent rubber plug 5-2, that may possibly be coupled with each other, to be carried to the orientation change device 70 in a preferred manner.

[Functions and Effects of Embodiment 1]

The rubber plug supply apparatus 10 and the supply process of the rubber plug according to embodiment 1 are described above. Now, the functions and effects provided by the rubber plug supply apparatus 10 according to embodiment 1 will be described.

The rubber plug supply apparatus 10 according to this embodiment moves the position of the first through-hole 51 of the orientation correction device 40 with respect to the discharge port 22b of the supply tube 22 among the directly facing position P1 directly facing the discharge port 22b, the left position P2 shifted from the directly facing position P1 and facing a part of the discharge port 22b, and the right position P3 set to be symmetrical to the left position P2 with respect to the directly facing position P1. With the rubber plug supply apparatus 10 having such a structure, the position of the first through-hole 51 with respect to the discharge port 22b is slightly moved, and therefore, the effect of swinging the first through-hole 51 with respect to the discharge port 22b is provided. As a result, the rubber plug 5 is accommodated into the first through-hole 51 easily.

In addition, the rubber plug supply apparatus 10 according to this embodiment repeats the movement of the first through-hole 51 with respect to the discharge port 22b. With such a structure, the movement of the first through-hole 51 with respect to the discharge port 22b is repeated, and therefore, the effect of swinging the first through-hole 51 with respect to the discharge port 22b is further exhibited. As a result, the rubber plug 5 is accommodated into the first through-hole 51 more easily.

The orientation correction device 40 of the rubber plug supply apparatus 10 according to this embodiment includes the movable body 50 including the first through-hole 51, the orientation change device 70 changing the orientation of the rubber plug 5, and the transportation device 60 moving the movable body 50. The rubber plug supply apparatus 10 drives the transportation device 60 to perform the swing motion of the first through-hole 51 with respect to the discharge port 22b. With such a structure, there is no need to provide a special mechanism to perform the swing motion of the first through-hole 51 with respect to the discharge port 22b.

The rubber plug supply apparatus 10 according to this embodiment further includes the insertion device 80 injecting air into the first through-hole 51 in a state where the first through-hole 51 and the rotation through-hole 71a of the orientation change device 70 are in communication with each other, to push the rubber plug 5 into the rotation through-hole 71a. With such a structure, the injection of the air by the insertion device 80 moves the rubber plug 5 from the first through-hole 51 to the orientation change device 70 with more certainty.

The rotation through-hole 71a of the rubber plug supply apparatus 10 according to this embodiment includes the small portion 71a3 having a cross-section smaller than that of the maximum outer shape of the rubber plug 5 as seen in the axial direction thereof. The small portion 71a3 stops the rubber plug 5, inserted into the rotation through-hole 71a, at the central portion of the rotation through-hole 71a in the axial direction thereof, and allows the rubber plug 5 to pass through the rotation through-hole 71a in a deformed state while the rubber plug 5 is dispatched from the rotation through-hole 71a by the dispatch device 90. With such a structure, the rubber plug 5 is stopped by the small portion 71a3 at the central portion of the rotation through-hole 71a in the axial direction thereof. This makes it difficult for the rubber plug 5 to jump out of the rotation through-hole 71a even though the rotatable body 71 is rotated. Therefore, the rotatable body 71 is allowed to be rotated at a high speed, which shortens the time period required to correct the orientation of the rubber plug 5. While being dispatched from the rotation through-hole 71a by the dispatch device 90, the rubber plug 5 is allowed to pass through the small portion 71a3 in a deformed state. Therefore, the small portion 71a3 does not prevent the rubber plug 5 from being dispatched.

The dispatch device 90 of the rubber plug supply apparatus 10 according to this embodiment includes the first injection portion 92 connected with the rotation through-hole 71a and injecting air in the dispatch direction of the rubber plug 5, and the second injection portion 93 provided at the dispatch tube 91 and injecting air in the dispatch direction of the rubber plug 5. With such a structure, the first injection portion 92 provided upstream in the dispatch direction of the rubber plug 5 with respect to the rotation though-hole 71a and pushing the rubber plug 5 by the injection of the air, and the second injection portion 93 provided downstream in the dispatch direction of the rubber plug 5 with respect to the rotation though-hole 71a and pulling the rubber plug 5 by a pressure decreasing effect provided by the injection of the air, dispatch the rubber plug 5 more effectively. In addition, the rubber plug 5 transported to a position downstream in the dispatch direction with respect to the second injection portion 93 is pushed by the air injected by the second injection portion 93. Therefore, the rubber plug 5 is dispatched at a higher speed.

The supply device 20 of the rubber plug supply apparatus 10 according to this embodiment includes the air supply portion 24 connected with the accommodation tank 21 and supplying air to the accommodation tank 21. The supply tube 22 has a tubular shape including the slit 22c formed in the side surface thereof. With such a structure, the movement of the rubber plug 5 from the accommodation tank 21 to the supply tube 22 is assisted stably regardless of the state of the rubber plug 5 in the supply tube 22 for the above-described reason.

In this embodiment, the slit 22c is formed in a portion closer to the discharge port 22b than the middle portion of the supply tube 22. With the slit 22c formed in this manner, the flow of the air in the supply tube 22 toward the discharge port 22b is generated stably regardless of the state of the rubber plug 5 in the supply tube 22 for the above-described reason. This flow of the air assists, stably, the rubber plug 5 in moving in the supply tube 22.

In this embodiment, the slit 22c is formed to reach the end, of the supply tube 22, at which the discharge port 22b is formed. With the slit 22c formed in this manner, the flow of the air toward the discharge port 22b is generated stably in the entirety of the supply tube 22 regardless of the state of the rubber plug 5 in the supply tube 22. This flow of the air assists, more stably, the rubber plug 5 in moving in the supply tube 22.

Modifications of Embodiment 1

The rubber plug supply apparatus 10 according to this embodiment may be carried out in some modifications. Hereinafter, some preferred modifications of embodiment 1 will be described. In the following description of the modifications, elements having substantially the same functions as those of embodiment 1 will bear the same reference signs as in embodiment 1. Overlapping descriptions will be omitted or simplified when appropriate. These are also applicable to descriptions of embodiments 2 and 3 and other embodiments.

Modification 1

According to preferred modification 1, the swing motion of the movable body 50 may be performed to move the rubber plug 5 from the first through-hole 51 of the movable body 50 to the rotation through-hole 71a of the rotatable body 71. Referring to, for example, FIG. 8, in this modification, start of the swing motion of the movable body 50 may be added after step S08B (confirmation of the arrival of the movable body 50 at the dispatch position Pt), and stop of the swing motion may be added after step S10B (confirmation of the accommodation of the rubber plug 5 in the rotation through-hole 71a). It should be noted that the swing motion of the movable body 50 may be started or stopped at any other timing at which the swing motion may be started or stopped.

In this case, the accommodation assistant 107 may drive the transportation device 60 to move the position of the first through-hole 51 with respect to the rotation through-hole 71a among a directly facing position directly facing the rotation through-hole 71a, a left position shifted from the directly facing position and facing a part of the rotation through-hole 71a, and a right position set to be symmetrical to the left position with respect to the directly facing position.

With the rubber plug supply apparatus 10 described above, the rubber plug 5 is moved from the first through-hole 51 to the rotation through-hole 71a with more certainty for a reason substantially the same as that described above regarding the movement of the rubber plug 5 from the discharge port 22b to the first through-hole 51.

Modification 2

According to preferred modification 2, a swing motion of swinging the rotatable body 71 about the rotation shaft 72 may be performed to move the rubber plug 5 from the first through-hole 51 of the movable body 50 to the rotation through-hole 71a of the rotatable body 71. The swing motion of the rotatable body 71 may be performed at substantially the same timing as that in modification 1.

In this case, the accommodation assistant 107 may drive the rotation driving portion 73 to move the position of the rotation through-hole 71a with respect to the first through-hole 51 among a directly facing position directly facing the first through-hole 51, a left position shifted from the directly facing position and facing a part of the first through-hole 51, and a right position set to be symmetrical to the left position with respect to the directly facing position. In the swing motion of the rotatable body 71, the angle by which the rotatable body 71 is swung may be, for example, 10 degrees at most in each of clockwise and counterclockwise directions.

With the rubber plug supply apparatus 10 described above, the rubber plug 5 is moved from the first through-hole 51 to the rotation through-hole 71a with more certainty, like in modification 1.

Modification 3

Figure 12:
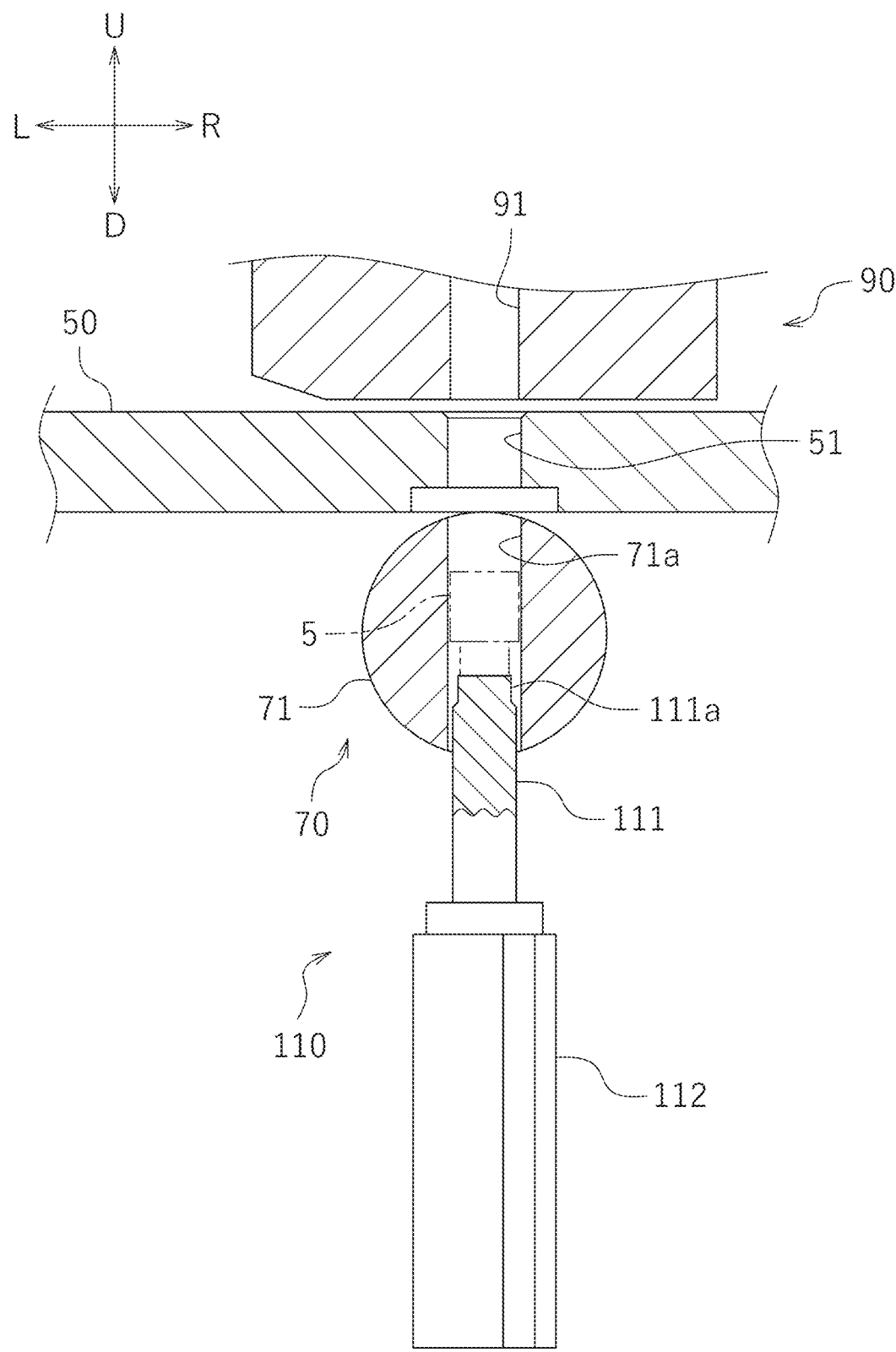
FIG. 12 is a partial cross-sectional view schematically showing the orientation change device and the vicinity thereof of the rubber plug supply apparatus according to a modification of embodiment 1.

According to preferred modification 3, the rubber plug supply apparatus 10 may include a stopper that is hit by, and stops, the rubber plug 5 inserted into the rotation through-hole 71a, instead of the rotation through-hole 71a of the rotatable body 71 including the small portion 71a3. FIG. 12 is a partial cross-sectional view schematically showing the orientation change device 70 and the vicinity thereof of the rubber plug supply apparatus 10 according to modification 3. As shown in FIG. 12, the rubber plug supply apparatus 10 according to this modification includes a stopper device 110 including a stopper 111 and an actuator 112. The stopper 111 is inserted into the rotation through-hole 71a of the rotatable body 71 in a state where the rotation through-hole 71a is in communication with the first through-hole 51 of the movable body 50. In this modification, the stopper 111 is inserted from a bottom opening of the rotation through-hole 71a (the opening opposite to an opening in communication with the first through-hole 51) in the state where the rotation through-hole 71a and the first through-hole 51 are in communication with each other. In this modification, the stopper 111 is cylindrical. The stopper 111 has a diameter slightly shorter than the diameter of the rotation through-hole 71a. A tip portion 111a of the stopper 111 has a diameter shorter than that of the rest of the stopper 111 so as to be easily inserted into the rotation through-hole 71a. It should be noted that the stopper 111 merely needs to be insertable into the rotation through-hole 71a, and there is no specific limitation on the shape or the size thereof. The actuator 112 inserts the stopper 111 into the rotation through-hole 71a and separates the stopper 111 from the rotation through-hole 71a. The actuator 112 is, for example, an air cylinder. It should be noted that there is no specific limitation on the type of the actuator 112. The actuator 112 may be, for example, an electric motor or the like.

Referring to, for example, FIG. 8, in this modification, the stopper 111 may be inserted into the rotation through-hole 71a after step S08B (confirmation of the arrival of the movable body 50 at the dispatch position Pt), and the stopper 111 may be pulled out of the rotation through-hole 71a after step S11B (deactivation of the insertion device 80). It should be noted that the insertion of the stopper 111 into the rotation through-hole 71a and the separation of the stopper 111 from the rotation through-hole 71a may be performed at any other timing at which the stopper 111 may be inserted or separated.

The stopper 111 is provided so as to stop the rubber plug 5, inserted into the rotation through-hole 71a, at the central portion of the rotation through-hole 71a in the axial direction thereof, in a state where the stopper 111 is inserted into the rotation through-hole 71a. In this modification, the stopper 111 is inserted into the rotation through-hole 71a up to such a position that the rubber plug 5 hits the stopper 111 and is stopped at the central position of the rotation through-hole 71a in the axial direction thereof. Preferably, the rotation through-hole 71a may be shaped such that the rubber plug 5 is inserted thereinto while being slightly deformed. Such a shape of the rotation through-hole 71a allows the rubber plug 5 to be kept at the position because of the elastic force thereof even after the stopper 111 is pulled out of the rotation through-hole 71a. In this modification, the insertion of the stopper 111 into the rotation through-hole 71a is expected to provide a preferred effect of correcting the rotation position of the rotatable body 71 and as a result, allowing the rotation through-hole 71a and the first through-hole 51 to directly face each other more accurately.

With the rubber plug supply apparatus 10 having such a structure, the stopper 111 stops the rubber plug 5 at the central position of the rotation through-hole 71a in the axial direction thereof, like the small portion 71a3 in embodiment 1. This makes it difficult for the rubber plug 5 to jump out of the rotation through-hole 71a even though the rotatable body 71 is rotated. Therefore, the rotatable body 71 is allowed to be rotated at a high speed.

In this modification, the stopper 111 is inserted into the rotation through-hole 71a from the opening opposite to the opening in communication with the first through-hole 71a. Alternatively, for example, the stopper 111 may be inserted in a direction crossing the axial direction of the rotation through-hole 71a (for example, in a horizontal direction) from an opening formed in an inner side surface of the rotation through-hole 71a. In this modification, the stopper 111 does not rotate together with the rotatable body 71, and is pulled out of the rotation through-hole 71a before the rotatable body 71 rotates. Alternatively, the stopper 111 may rotate together with the rotatable body 71. Such a structure is easily realized in the case where the stopper 111 is moved in the direction of the rotation shaft 72 (see FIG. 6) of the rotatable body 71.

Embodiment 2

Figure 13:
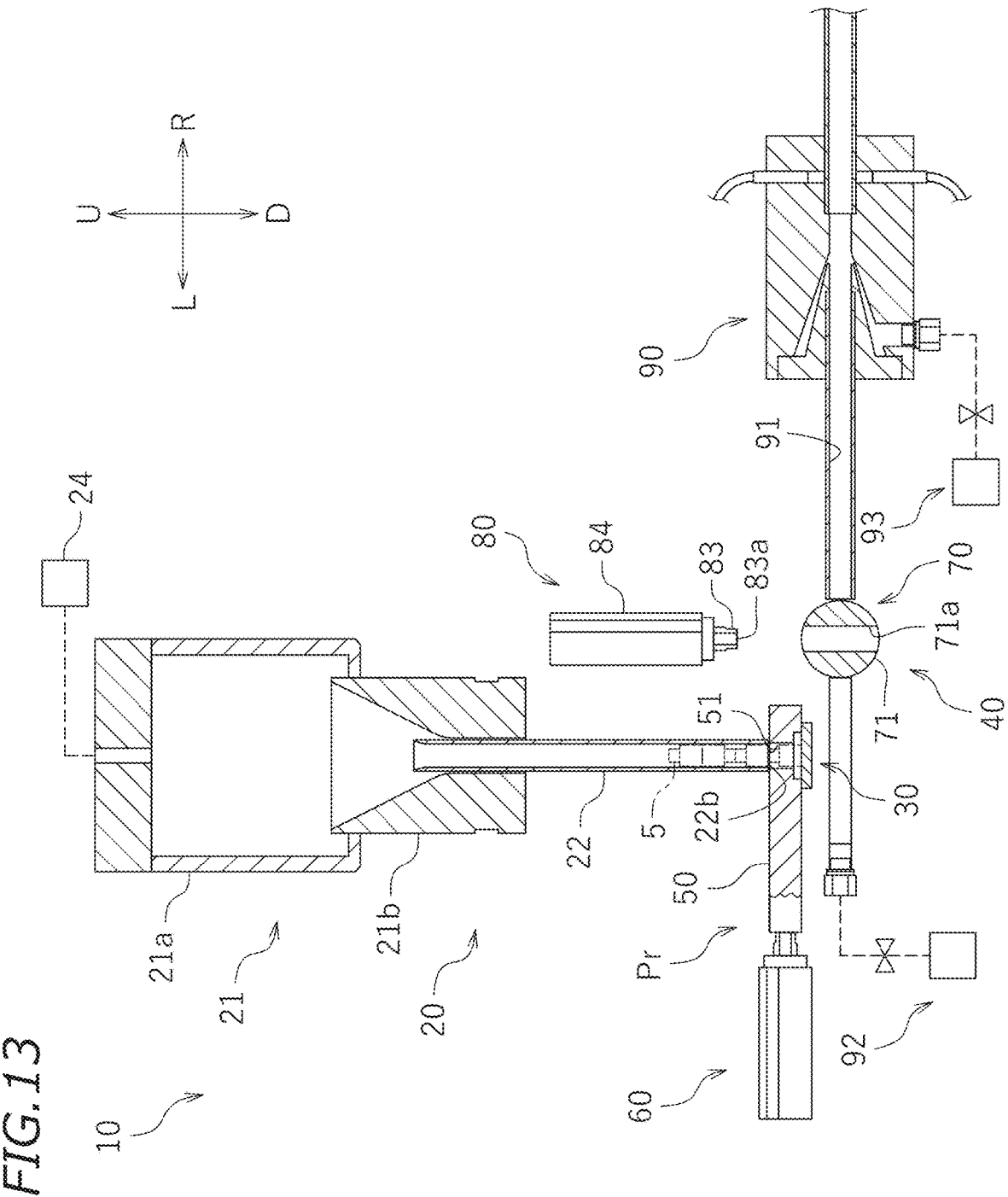
FIG. 13 is a schematic partial cross-sectional view of a rubber plug supply apparatus according to embodiment 2.

A rubber plug supply apparatus 10 according to embodiment 2 includes the insertion device 80 pushing the rubber plug 5 into the rotation through-hole 71a of the rotatable body 71 by pressing the rubber plug 5 with a pin, instead of by injecting the air. FIG. 13 is a schematic partial cross-sectional view of the rubber plug supply apparatus 10 according to embodiment 2. As shown in FIG. 13, in this embodiment, the insertion device 80 includes an insertion pin 83 and an actuator 84. The insertion pin 83 contacts the rubber plug 5 in a state where the first through-hole 51 of the movable body 50 and the rotation through-hole 71a of the rotatable body 71 are in communication with each other (see FIG. 14). As shown in FIG. 13, the insertion pin 83 is located above the rotatable body 71. The insertion pin 83 is cylindrical. The insertion pin 83 has a diameter slightly shorter than that of each of the first through-hole 51 and the rotation through-hole 71a. A tip portion 83a of the insertion pin 83 has a diameter slightly shorter than that of the rest of the insertion pin 83 so as to be easily inserted into the rotation through-hole 71a. It should be noted that the insertion pin 83 merely needs to have a structure by which at least a portion that needs to be inserted into the first through-hole 51 and the rotation through-hole 71a is insertable thereinto, and there is no further specific limitation on the shape or the size thereof.

The actuator 84 moves the insertion pin 83 in the axial direction of the first through-hole 51 and the rotation through-hole 71a, specifically, in this embodiment, in the up-down direction. The actuator 84 is, for example, an air cylinder. It should be noted that there is no specific limitation on the type of the actuator 84. The actuator 84 may be, for example, an electric motor or the like. The insertion device 80 drives the actuator 84 to press the rubber plug 5 with the insertion pin 83, and thus to push the rubber plug 5 into the rotation through-hole 71a of the rotatable body 71.

In this embodiment, the insertion device 80 is located above the rotatable body 71, and the supply tube 91 extends in the left-right direction. The orientation change device 70 rotates the rotatable body 71 by 90 degrees clockwise or counterclockwise from such a rotation position that the axial direction of the rotation through-hole 71a is in the up-down direction, to adjust the orientation of the rubber plug 5 to the normal orientation. When the rotatable body 71 is rotated by 90 degrees clockwise or counterclockwise from such a rotation position that the axial direction of the rotation through-hole 71a is in the up-down direction, the dispatch device 90 is connected with the rotation through-hole 71a.

[Supply Process]

Hereinafter, a supply process of the rubber plug 5 by the rubber plug supply apparatus 10 according to this embodiment will be described briefly. According to an example of the supply process of the rubber plug 5 described below, the rubber plug 5 is accommodated into the first through-hole 51 of the movable body 50 by the movement of the hopper portion 21b in the up-down direction, the pressurization on the accommodation tank 21 by the air supply portion 24, and the swing motion of the movable body 50, like in embodiment 1. Like in embodiment 1, the position of the movable body 50 at which the discharge port 22b and the first through-hole 51 are in communication with each other will be referred to as a "receiving position Pr". The confirmation of the arrival of the rubber plug 5 at the first through-hole 51 and the detection of the orientation of the rubber plug 5 are performed in the same manner as in embodiment 1. At this point, the rotatable body 71 is at such a rotation position that the axial direction of the rotation through-hole 71a is in the up-down direction. In this embodiment, the movable body 50 does not include the second through-hole 52.

Figure 14:
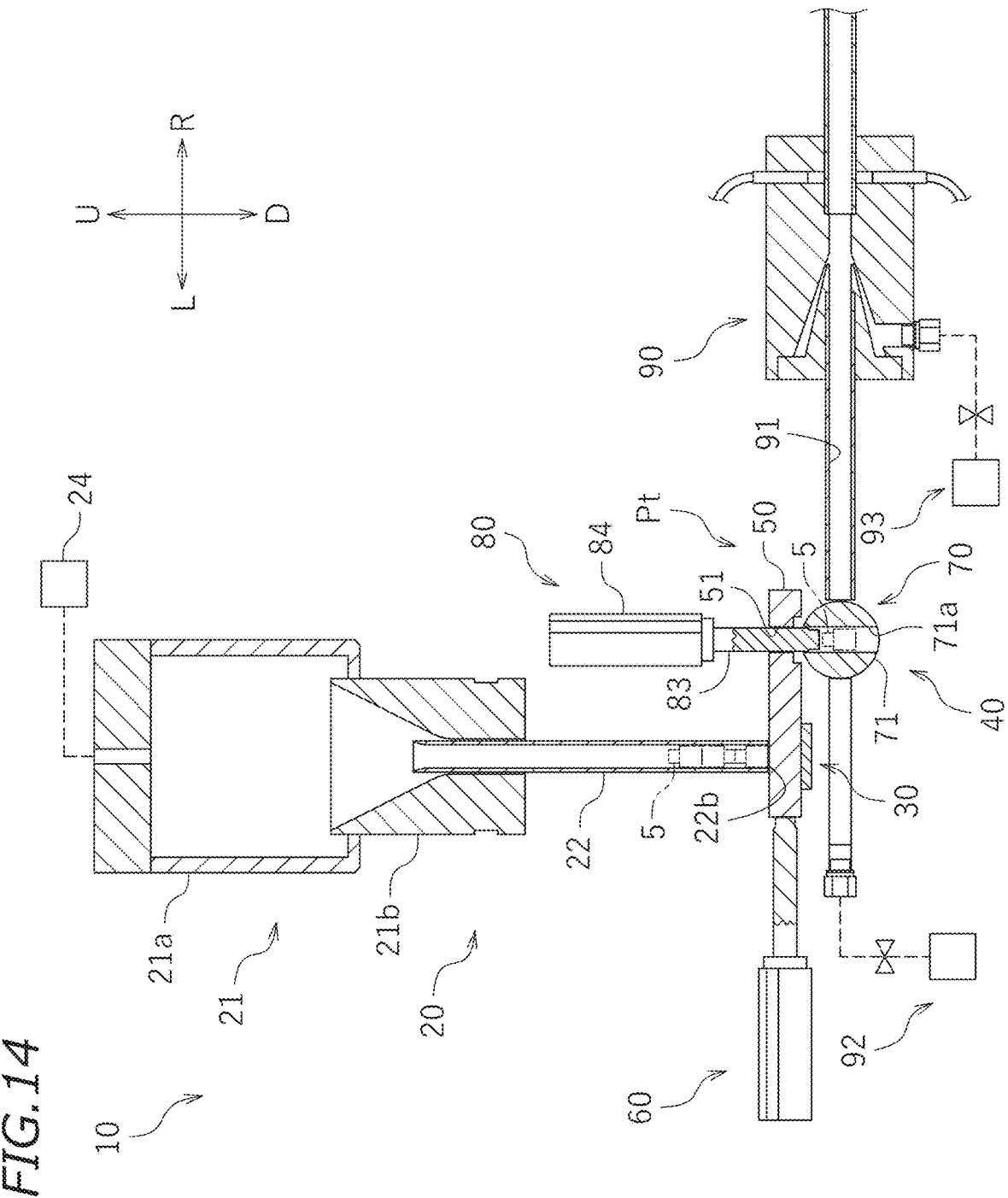
FIG. 14 is a partial cross-sectional view schematically showing the rubber plug supply apparatus in a state where the movable body is at the dispatch position.

When the orientation of the rubber plug 5 is detected by the orientation detection device 30, the movable body 50 is moved from the receiving position Pr to the dispatch position Pt (like in embodiment 1, the dispatch position Pt is such a position of the movable body 50 that the first through-hole 51 is connected with the orientation change device 70) by the transportation device 60. FIG. 14 is a partial cross-sectional view schematically showing the rubber plug supply apparatus 10 in a state where the movable body 50 is at the dispatch position Pt. As shown in FIG. 14, in the state where the movable body 50 is at the dispatch position Pt, the rotation through-hole 71a of the rotatable body 71 is in communication with the bottom end of the first through-hole 51. In the state where the movable body 50 is at the dispatch position Pt, the insertion pin 83 is above the first through-hole 51.

Upon confirmation of the arrival of the movable body 50 at the dispatch position Pt, as shown in FIG. 14, the insertion pin 83 is moved downward by the actuator 84. As a result, the insertion pin 83 is inserted into the first through-hole 51 and contacts the rubber plug 5 in the first through-hole 51. The insertion pin 83 thus presses the rubber plug 5 to push the rubber plug 5 into the rotation through-hole 71a of the rotatable body 71. In this manner, the rubber plug 5 is accommodated into the rotation through-hole 71a. The rotation through-hole 71a may have a cross-section having such a shape that allows the rubber plug 5 to be accommodated into the rotation through-hole 71a while being slightly deformed. With such a shape of the cross-section, the rubber plug is kept at the position in the rotation through-hole 71a to which the rubber plug 5 has been pushed by the insertion pin 83. The insertion of the insertion pin 83 into the rotation through-hole 71a is expected to provide a preferred effect of correcting the rotation position of the rotatable body 71 and as a result, allowing the rotation through-hole 71a and the first through-hole 51 to directly face each other more accurately.

Upon confirmation of the accommodation of the rubber plug 5 in the rotation through-hole 71a, the insertion pin 83 is moved upward. As a result of this movement, the insertion pin 83 is pulled out of the rotation through-hole 71a and the first through-hole 51, and returns to the position thereof at the start of the process. Upon confirmation by a sensor (not shown) provided in the insertion device 80 that the insertion pin 83 is back at the position at the start of the process, the movable body 50 is moved to the receiving position Pr.

Figure 15:
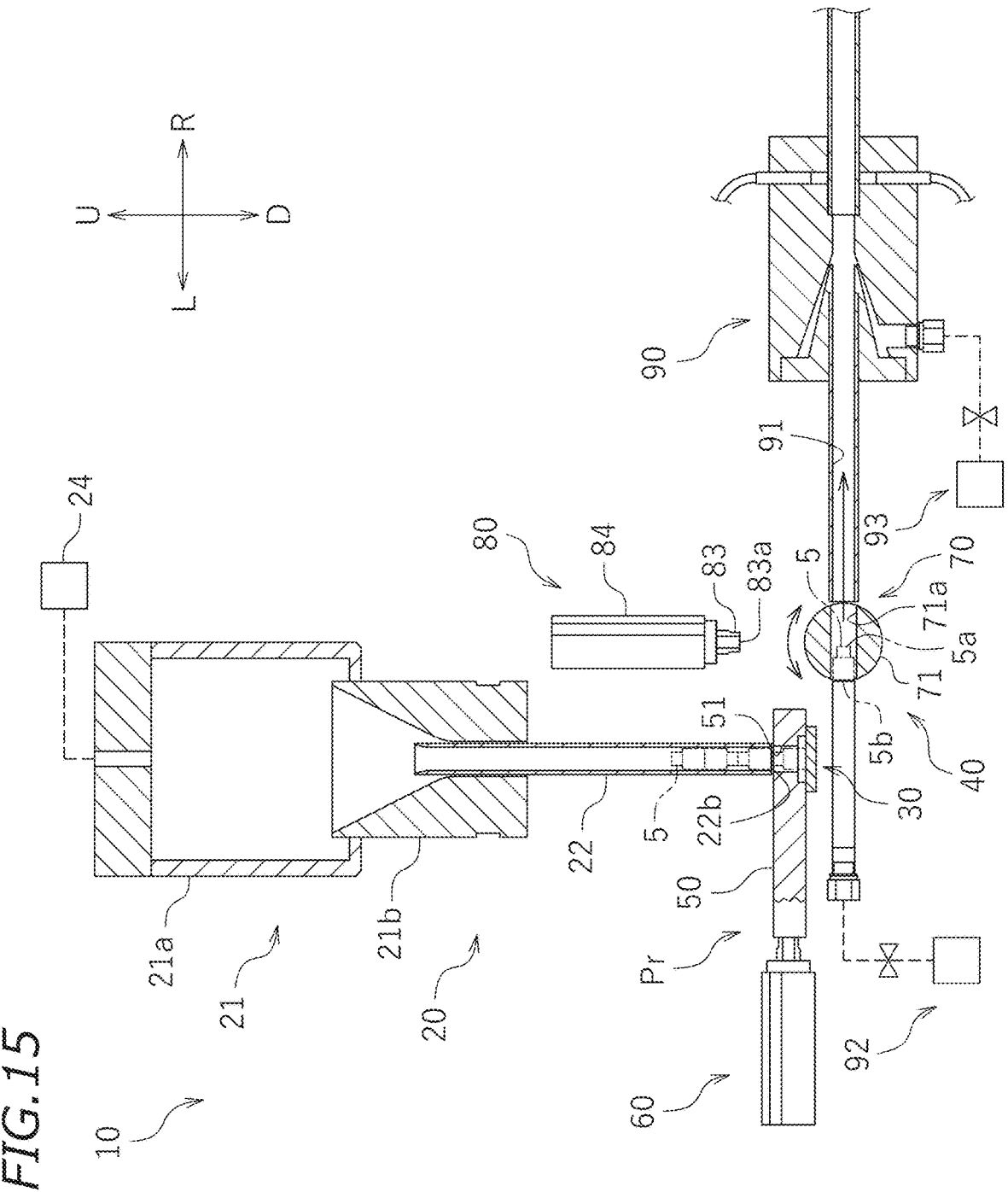
FIG. 15 is a partial cross-sectional view schematically showing the rubber plug supply apparatus after the orientation of the rubber plug is corrected.

In the next step, the rotatable body 71 is rotated by 90 degrees clockwise or counterclockwise. In more detail, in the case where the rubber plug 5 is detected to be supplied in the normal orientation (the orientation by which the front end 5a is directed upward), the rotatable body 71 is rotated by 90 degrees clockwise. In the case where the rubber plug 5 is detected to be supplied in the reverse orientation (the orientation by which the rear end 5b is directed upward), the rotatable body 71 is rotated by 90 degrees counterclockwise. FIG. 15 is a partial cross-sectional view schematically showing the rubber plug supply apparatus 10 after the orientation of the rubber plug 5 is corrected. As shown in FIG. 15, the clockwise or counterclockwise rotation of the rotatable body 71 adjusts the rubber plug 5 such that the front end 5a is directed rightward. The rotatable body 71 may be rotated by 90 degrees or 270 degrees in the same rotation direction.

In this embodiment, the dispatch tube 91 and the second injection portion 93 are provided to the right of the rotatable body 71. The first injection portion 92 is provided to the left of the rotatable body 71. Therefore, when the first injection portion 92 and the second injection portion 93 are driven, the rubber plug 5 is dispatched rightward. At this point, the rubber plug 5 is dispatched with the front end 5a being directed forward in the dispatch direction. Alternatively, the dispatch device 90 may dispatch the rubber plug 5 leftward or any other direction. The rotation angle of the rotatable body 71 to correct the orientation of the rubber plug 5 may be set in accordance with the dispatch direction of the rubber plug 5.

With the rubber plug supply apparatus 10 according to this embodiment, the pressing on the rubber plug 5 by the insertion pin 83 moves the rubber plug 5 from the first through-hole 51 to the rotation through-hole 71a of the orientation correction device 40 with certainty. In particular, the system of using the insertion pin 83 puts, with certainty, the rubber plug 5 at a desired position in the rotation through-hole 71a, for example, at the central position of the rotation through-hole 71a in the axial direction thereof. The system of using the insertion pin 83 also controls the position of the insertion pin 83 to put the rubber plug 5 of any of various lengths at a desired position in the rotation through-hole 71a with no need to change the structure of the other components.

Embodiment 3

Figure 16:
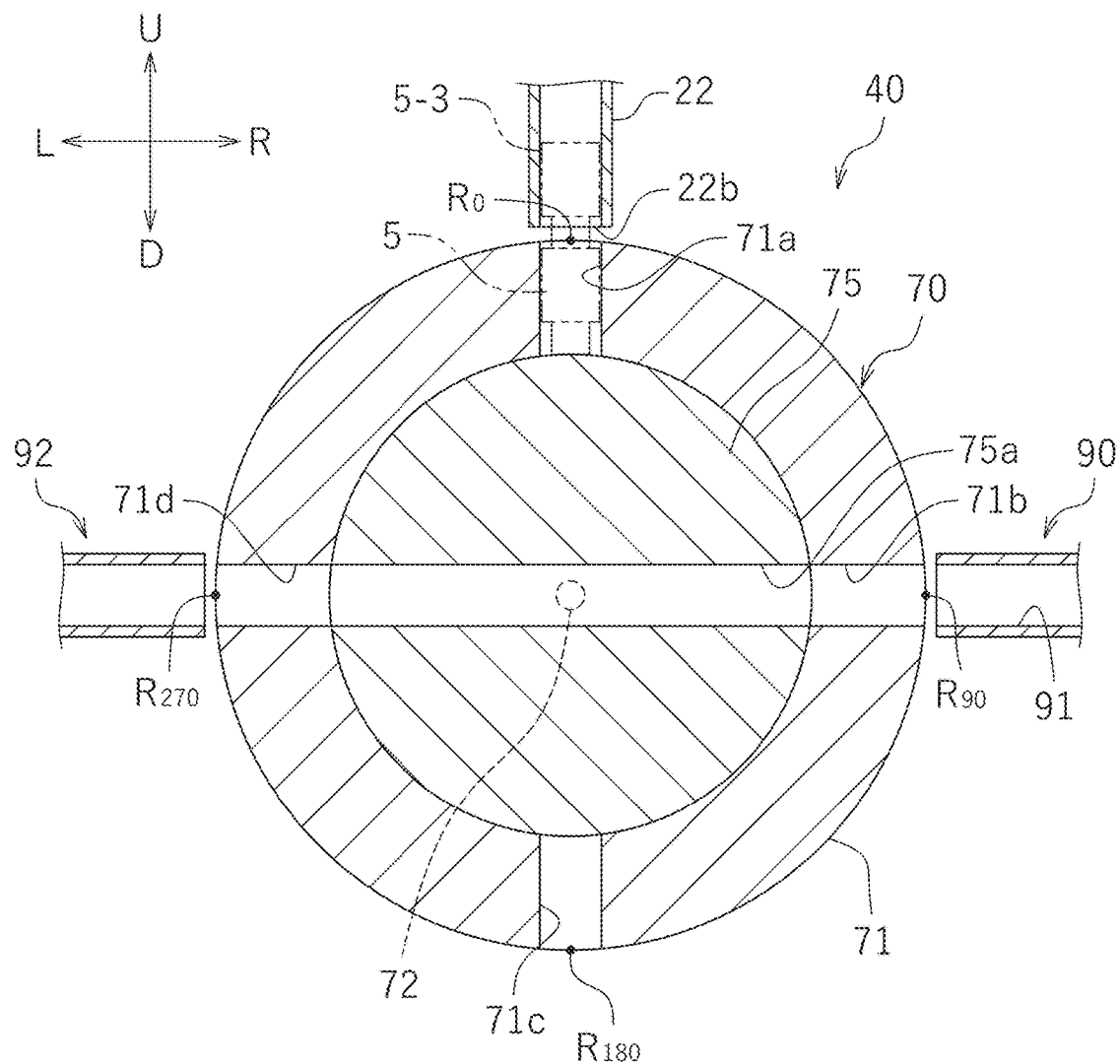
FIG. 16 is a cross-sectional view schematically showing the orientation change device and the vicinity thereof of a rubber plug supply apparatus according to embodiment 3.

A rubber plug supply apparatus 10 according to embodiment 3 is structured such that the rubber plug 5 is directly transferred from the supply tube 22 to the rotatable body 71. FIG. 16 is a cross-sectional view schematically showing the orientation change device 70 and the vicinity thereof of the rubber plug supply apparatus 10 according to embodiment 3. As shown in FIG. 16, in the rubber plug supply apparatus according to embodiment 3, the rotatable body 71 is located below the discharge port 22b of the supply tube 22. In this embodiment, the swing motion to smoothly move the rubber plug 5 from the discharge port 22b of the supply tube 22 to an accommodation hole of the orientation correction device 40 (the accommodation hole is, in this embodiment, four rotation through-holes 71a through 71d of the rotatable body 71) is performed by a swing motion of the rotatable body 71 about the rotation shaft 72.

First, a structure of the rubber plug supply apparatus 10 and a process of correcting the orientation of, and dispatching, the rubber plug 5 according to embodiment 3 will be described briefly. As shown in FIG. 16, the rotatable body 71 according to this embodiment is ring-shaped as seen in the front-rear direction. The rotatable body 71 includes a first rotation through-hole 71a, a second rotation through-hole 71b, a third rotation through-hole 71c, and a fourth rotation through-hole 71d. The first through fourth rotation through-holes 71a through 71d run through the ring-shaped rotatable body 71 from an outer circumferential surface toward the center thereof. The first through fourth rotation through-holes 71a through 71d are separated from each other by 90 degrees.

The rubber plug supply apparatus 10 according to this embodiment includes a connection tube 75a provided inner to the ring-shaped rotatable body 71 and extending in the left-right direction. In this embodiment, the connection tube 75a is a through-hole running, in the left-right direction, throughout a non-rotatable support 75 provided inner to the rotatable body 71. The controller 100 controls the rotation driving portion 73 (see FIG. 7) to move the rotatable body 71 among a rotation position at which the first rotation through-hole 71a is above the support 75 (this rotation position will be referred to as a "0-degree position $R_0$"), a rotation position at which the first rotation through-hole 71a is to the right of the support 75 (this rotation position will be referred to as a "90-degree position $R_{90}$"), a rotation position at which the first rotation through-hole 71a is below the support 75 (this rotation position will be referred to as a "180-degree position $R_{180}$"), and a rotation position at which the first rotation through-hole 71a is to the left of the support 75 (this rotation position will be referred to as a "270-degree position $R_{270}$").

As shown in FIG. 16, in this embodiment, the first injection portion 92 is connected with the rotation through-hole located to the left of the support 75. The dispatch tube 91 is in communication with the rotation through-hole located to the right of the support 75. The rubber plug 5 is dispatched rightward by the dispatch device 90.

The orientation of the rubber plug 5 is corrected by rotating the rotatable body 71 by 90 degrees clockwise or counterclockwise. In this embodiment, the rubber plug is supplied from the supply tube 22 to the rotation through-hole (any one of the rotation through-holes 71a through 71d) positioned above the support 75. In this embodiment, the orientation of the rubber plug 5 is detected in a state where the rubber plug 5 is accommodated in the rotation through-hole positioned above the support 75. The rubber plug supply apparatus 10 rotates the rotatable body 71 by 90 degrees clockwise or counterclockwise in accordance with the orientation of the rubber plug 5 in the rotation though-hole positioned above the support 75. In the case where the rotatable body 71 is rotated by 90 degrees clockwise, the rubber plug 5 is sent to the dispatch tube 91 from the rotation through-hole in which the rubber plug 5 is accommodated, by the air injected by the first injection portion 92 and the second injection portion 93 (see FIG. 1 and the like). In the case where the rotatable body 71 is rotated by 90 degrees counterclockwise, the rubber plug 5 is sent to the dispatch tube 91 from the rotation through-hole in which the rubber plug 5 is accommodated, via the connection tube 75a and the rotation through-hole facing the rotation through-hole in which the rubber plug has been accommodated, by the air injected by the first injection portion 92 and the second injection portion 93.

With such a structure, when, for example, the rotatable body 71 is at the 90-degree position $R_{90}$ or the 270-degree position $R_{270}$, at which the first rotation through-hole 71a is connected with the dispatch device 90, the fourth rotation through-hole 71*d* or the second rotation through-hole 71*b* directly faces the discharge port 22*b* of the supply tube 22 respectively. Therefore, the dispatch of the rubber plug 5 and the accommodation of the rubber plug 5 into the rotation through-hole are performed at the same time. This is also applicable to the other rotation through-holes 71*b* through 71*d*.

The accommodation assistant 107 according to this embodiment drives the rotation driving portion 73 to move the rotatable body 71 to four rotation positions respectively slightly shifted from the 0-degree position $R_0$, the 90-degree position $R_{90}$, the 180-degree position $R_{180}$ and the 270-degree position $R_{270}$. Hereinafter, these four positions will be referred to also as "exceeding positions". The motion of moving the rotatable body 71 to each of the exceeding positions will be referred to also as an "exceeding motion". The exceeding positions and the exceeding motion will be described below in detail.

[Accommodation Process]

Figure 17A:
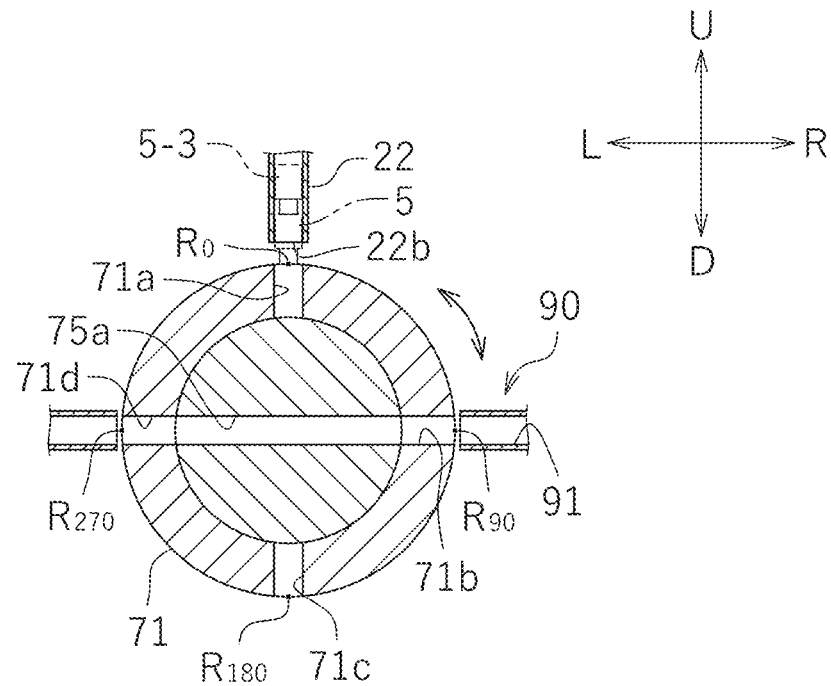
FIG. 17A is a schematic view showing a swing motion and an exceeding motion.
Figure 17B:
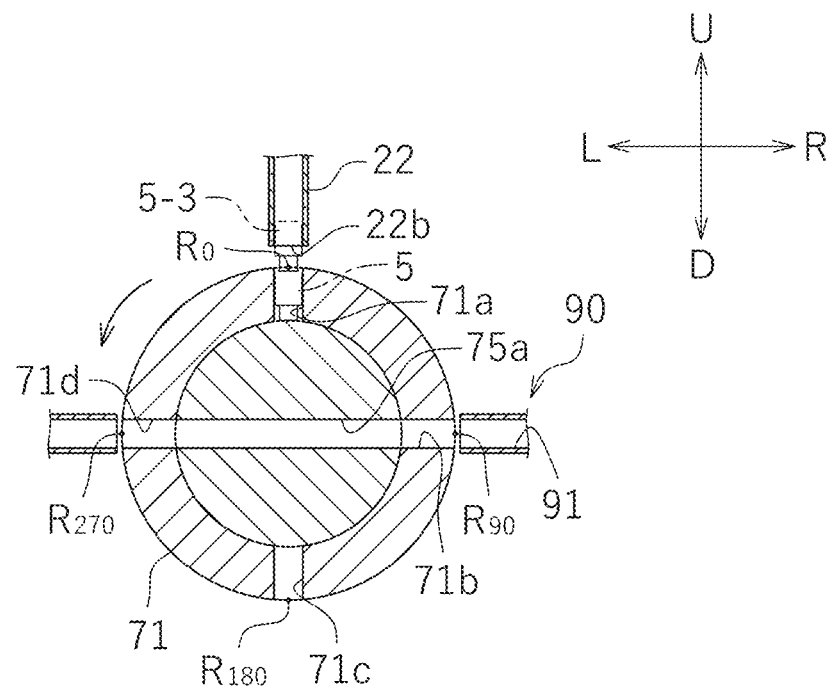
FIG. 17B is a schematic view showing the swing motion and the exceeding motion.
Figure 17C:
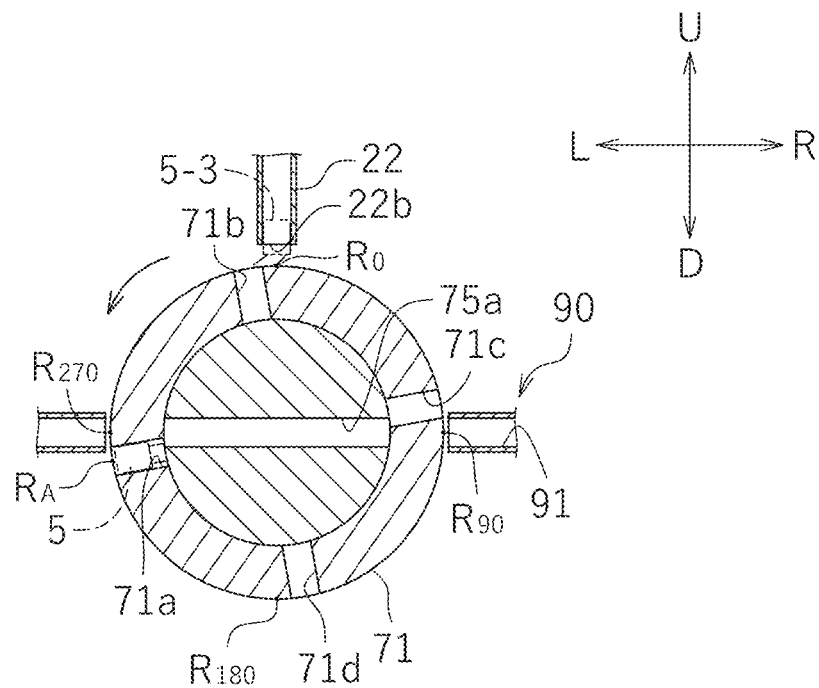
FIG. 17C is a schematic view showing the swing motion and the exceeding motion.
Figure 17D:
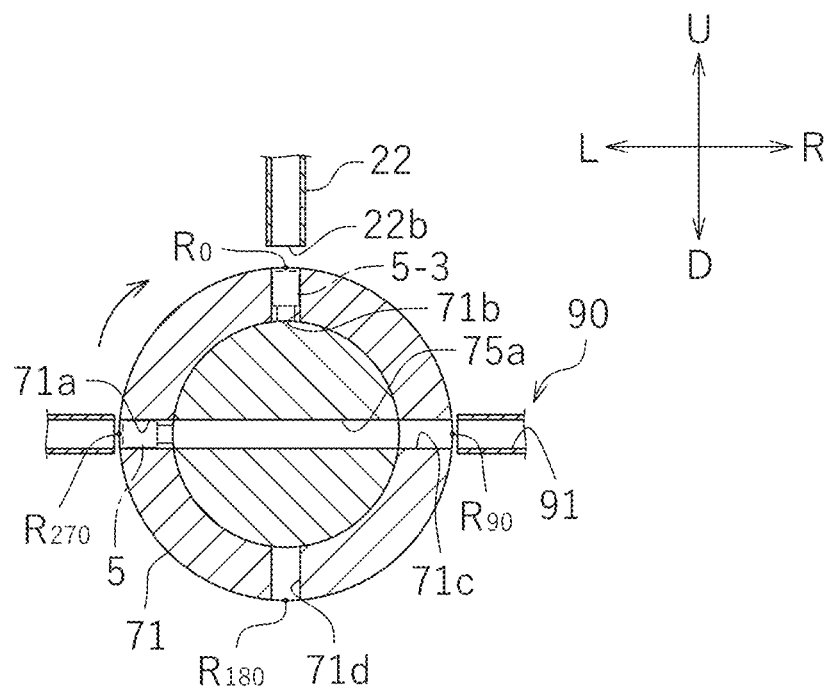
FIG. 17D is a schematic view showing the swing motion and the exceeding motion.

Hereinafter, a process of accommodating the rubber plug 5 into the rotation through-holes 71*a* through 71*d* of the rotatable body 71 will be described, by way of an example in which the process starts from a state where the rotatable body 71 is at the 0-degree position $R_0$. In this embodiment, the rubber plug supply apparatus 10 performs the exceeding motion after performing the swing motion of the rotatable body 71. FIG. 17A through FIG. 17D are schematic views showing the swing motion and the exceeding motion. FIG. 17A shows the swing motion of the rotatable body 71. FIG. 17B through FIG. 17D show the exceeding motion of the rotatable body 71. As shown in FIG. 17B through FIG. 17D, in this example, the rotatable body 71 is rotated counterclockwise to correct the orientation of the rubber plug 5.

As shown in FIG. 17A, according to the swing motion, the accommodation assistant 107 drives the rotation driving portion 73 to move the position of the first rotation through-hole 71*a* with respect to the discharge port 22*b* of the supply tube 22 in a reciprocating manner among a directly facing position (0-degree position $R_0$), a left position and a right position. The directly facing position (0-degree position $R_0$) is the position at which the first rotation through-hole 71*a* directly faces the discharge port 22*b*. The left position is shifted counterclockwise from the directly facing position, such that the first rotation through-hole 71*a* faces a part of the discharge port 22*b*. The right position is shifted clockwise from the directly facing position, such that the first rotation through-hole 71*a* faces a part of the discharge port 22*b*. The right position is symmetrical to the left position with respect to the directly facing position. In the swing motion of the rotatable body 71, the rotatable body 71 is preferably swung by 10 degrees at most in each of the clockwise and counterclockwise directions. The swing motion is similar to that in embodiment 1, and thus the directly facing position, the left position and the right position are not shown. The function and effect of the swing motion are substantially the same as those in embodiment 1 and embodiment 2.

As shown in FIG. 17B, in this example, the rubber plug supply apparatus 10 drives the rotation driving portion 73 to rotate the rotatable body 71 counterclockwise in order to correct the orientation of the rubber plug 5. At this point, as shown in FIG. 17B, there may possibly be a case where the next rubber plug (referred to as a "rubber plug 5-3") slightly protrudes from the supply tube 22. The exceeding motion allows the next rubber plug 5-3 protruding from the supply tube 22 in this manner to be accommodated into the next rotation through-hole (in the example of FIG. 17A through FIG. 17D, the second rotation through-hole 71*b*) in a preferred manner.

As shown in FIG. 17C, in this embodiment, the accommodation assistant 107 rotates the rotatable body 71 from the 0-degree position $R_0$ to an exceeding position $R_A$, which is beyond the 270-degree position $R_{270}$ as seen from the 0-degree position $R_0$. The 270-degree position $R_{270}$ is the rotation position at which the first rotation through-hole 71*a* is connected with the dispatch device 90 and the second rotation through-hole 71*b* is in communication with the discharge port 22*b* of the supply tube 22. As a result of the rotation of the rotatable body 71 to the exceeding position $R_A$, as shown in FIG. 17C, the second rotation through-hole 71*b* contacts, and bend, the next rubber plug 5-3.

As shown in FIG. 17D, the accommodation assistant 107 further rotates the rotatable body 71 from the exceeding position $R_A$ to the 270-degree position $R_{270}$. This rotation returns the rotatable body 71 clockwise. This rotation solves the bending of the next rubber plug 5-3. As a result of the bending being solved, the next rubber plug 5-3 exhibits a behavior of being flicked, and thus drops into the second rotation through-hole 17*b* more smoothly. With such an exceeding motion, the next rubber plug 5-3, even when protruding from the supply tube 22, is accommodated into the next rotation through-hole in a preferred manner. Such an exceeding motion is particularly effective in the case where the rubber plug 5 is soft. Preferably, the angle by which the rotatable body 71 is rotated beyond the 270-degree position $R_{270}$ by the exceeding motion is, for example, 10 degrees at most.

As described above, with the rubber plug supply apparatus 10 according to this embodiment, the rotatable body 71 is rotated, and as a result, the swing motion of the rotation through-holes 71*a* through 71*d*, as accommodation holes in which the rubber plug 5 supplied from the discharge port 22*b* may be accommodated, is performed with respect to the discharge port 22*b*. Therefore, there is no need to provide a special mechanism to perform the swing motion.

With the rubber plug supply apparatus 10 according to this embodiment, the above-described exceeding motion allows the next rubber plug 5-3 to be accommodated into the corresponding rotation through-hole with more certainty.

Even in the rubber plug supply apparatus 10 structured to transfer the rubber plug 5 directly from the supply tube 22 to the rotatable body 71 as in this embodiment, in the case where the rubber plugs 5 that may possibly be coupled with each other are supplied, the rotatable body 71 may be rotated to perform the coupled rubber plugs separation motion.

Modifications of Embodiment 3

In embodiment 3 described above, the rotatable body 71 has four rotation through-holes 71*a* through 71*d* accommodating the rubber plug 5. Like in embodiment 1 and embodiment 2, the rotatable body 71 may have only one rotation through-hole 71*a* accommodating the rubber plug 5. In this case, only the swing motion is performed, and the exceeding motion does not need to be performed.

In the case where there is only one rotation through-hole, the rotation through-hole 71*a* may include the small portion 71*a*3. The rubber plug supply apparatus 10 may include the stopper device 110. The small portion 71*a*3 or the stopper device 110 allows the rubber plug 5 to be accommodated at, or in the vicinity of, the rotation center of the rotatable body 71, and therefore, the rubber plug 5 is suppressed from jumping out of the rotation through-hole 71*a* even though the rotatable body 71 is rotated, like in embodiment 1. This allow the rotatable body 71 to be rotated at a high speed, which shortens the time period required to correct the orientation of the rubber plug 5.

OTHER EMBODIMENTS

Some preferred embodiments are described above. The above-described embodiments are mere examples, and various other embodiments may be carried out.

For example, in the above-described embodiments, the swing motion of the movable body 50 or the rotatable body 71 is performed by moving the first through-hole 51 or the rotation through-hole 71 as an accommodation hole for the rubber plug 5, among the three positions of the directly facing position, the left position and the right position. Alternatively, the swing motion of the movable body 50 or the rotatable body 71 may be performed between the directly facing position and another position that is shifted from the directly facing position such that the first through-hole 51 or the rotation through-hole 71a faces a part of the discharge port 22b. Referring to the above-described embodiments, the swing motion may be performed between the directly facing position P1 and the left position P2 or the right position P3. Even in the case where the swing motion is performed in this manner, the rubber plug 5 is accommodated into the orientation correction device 40 with more certainty than in the case where no swing motion is performed. The swing motion does not need to be performed repeatedly, and may be performed only once.

In the above-described embodiments, the swing motion of the first through-hole 51 or the rotation through-holes 71a through 71d with respect to the discharge port 22b is performed by moving the movable body 50 or the rotatable body 71. Alternatively, the swing motion of the first through-hole 51 or the rotation through-holes 71a through 71d with respect to the discharge port 22b may be performed by moving the discharge port 22b. Still alternatively, the swing motion of the first through-hole 51 or the rotation through-holes 71a through 71d with respect to the discharge port 22b may be performed by moving both of the discharge port 22b and the first through-hole 51 or the rotation through-holes 71a through 71d.

In the above-described embodiments, the swing motion is performed by use of the movable body 51 or the rotatable body 71. The rubber plug supply apparatus may include, separately from the movable body or the rotatable body, an accommodation assistance device that performs the swing motion by moving one of, or both of, the accommodation hole and the discharge port. The rubber plug supply apparatus merely needs to move one of, or both of, the accommodation hole and the discharge port to move the position of the accommodation hole with respect to the discharge hole at least between a first position directly facing the discharge port and a second position shifted from the first position and facing a part of the discharge port. There is no further specific limitation on the structure of the rubber plug supply apparatus.

The conditions under which the repetition of the swing motion is to be finished is not limited to the confirmation of the accommodation of the rubber plug in the accommodation hole. For example, the swing motion may be repeated by a predetermined number of times, or for a predetermined time period. For example, the swing motion may be repeated even after the rubber plug is confirmed to have been accommodated in the accommodation hole, until the predetermined number of times is reached or the predetermined time period elapses. In the case where it is confirmed before the swing motion is started that the rubber plug has been accommodated in the accommodation hole, the swing motion may be omitted.

In the above-described embodiments, the orientation of the rubber plug 5 is corrected by rotating the rotatable body 71 accommodating the rubber plug 5. There is no specific limitation on the system of correcting the orientation of the rubber plug 5. For example, the rubber plug supply apparatus may include a dispatch tube in communication with each of two ends of the accommodation hole for the rubber plug. In this case, the rubber plug supply apparatus may correct the orientation of the rubber plug by dispatching the rubber plug from either one of the dispatch tubes in accordance with the orientation of the rubber plug accommodated in the accommodation hole.

In the above-described embodiments, the supply tube 22 includes the slit 22c formed therein as the opening. The opening formed in the supply tube 22 is not limited to the slit. The opening may be, for example, a through-hole or the like. The opening may be, for example, a gap between a plurality of tubes formed as a result of the supply tube being cut. The supply tube does not need to be provided as one tube. The supply tube may have a combination of openings of a plurality of shapes, such as a hole, a slit and the like. A part of, or all of, the openings may be formed in a portion of the supply tube that is closer to the supply port than the middle portion.

In the above-described embodiments, the dispatch device 90 injects compressed air to dispatch the rubber plug 5. There is no specific limitation on the structure of the dispatch device. The dispatch device may, for example, press the rubber plug 5 with a pin or the like to send the rubber plug 5 to the device as the dispatch destination.

The above-described embodiments do not limit the present invention unless otherwise specified.

REFERENCE SIGNS LIST 5 rubber plug
10 rubber plug supply apparatus
20 supply device
21 accommodation tank (accommodation portion)
22 supply tube (supply path)
22b discharge port
22c slit (opening)
24 air supply portion
30 orientation detection device
32 orientation detection sensor (sensor)
40 orientation correction device
50 movable body
51 first through-hole (accommodation hole)
60 transportation device
70 orientation change device
71 rotatable body
71a rotation through-hole (hole: embodiments 1 and 2; accommodation hole: embodiment 3
71a3 small portion
71b second rotation through-hole (another accommodation hole)
72 rotation shaft
73 rotation driving portion
80 insertion device
83 insertion pin (pressing body)
84 actuator (first actuator)
90 dispatch device
91 dispatch tube (dispatch path)

92 first injection portion
93 second injection portion
100 controller
107 accommodation assistant (accommodation assistance device)
110 stopper device
111 stopper
112 actuator (second actuator)
P1 directly facing position (first position)
P2 left position (second position)
P3 right position (third position)
$R_0$ 0-degree position (first rotation position)
$R_{270}$ 270-degree position (second rotation position)
$R_A$ exceeding position (third rotation position)

The invention claimed is:

1. A rubber plug supply apparatus, comprising:
a supply device including an accommodation portion accommodating a rubber plug, a supply path, in communication with the accommodation portion, through which the rubber plug passes, and a discharge port from which the rubber plug is discharged after passing through the supply path;
a sensor detecting an orientation of the rubber plug supplied by the supply device;
an orientation correction device including an accommodation hole accommodating the rubber plug, the orientation correction device changing the orientation of the rubber plug to a predetermined orientation in the case where the orientation of the rubber plug detected by the sensor is different from the predetermined orientation;
a dispatch device dispatching the rubber plug adjusted to be in the predetermined orientation; and
an accommodation assistance device moving one of, or both of, the accommodation hole and the discharge port in a reciprocating motion to move the position of the accommodation hole with respect to the discharge port at least between a first position directly facing the discharge port and a second position shifted from the first position and facing a part of the discharge port until the rubber plug is accommodated in the accommodation hole.

2. The rubber plug supply apparatus according to claim 1, wherein the accommodation assistance device moves the position of the accommodation hole with respect to the discharge port among the first position, the second position and a third position set to be symmetrical to the second position with respect to the first position.

3. The rubber plug supply apparatus according to claim 1, wherein the accommodation assistance device repeats moving the accommodation hole with respect to the discharge port.

4. The rubber plug supply apparatus according to claim 1, wherein:
the orientation correction device includes:
a movable body including the accommodation hole,
an orientation change device changing the orientation of the rubber plug, and
a transportation device capable of moving the movable body between a position at which the accommodation hole is in communication with the discharge port and a position at which the accommodation hole is connected with the orientation change device, and
the accommodation assistance device drives the transportation device to move the position of the accommodation hole with respect to the discharge port between the first position and the second position.

5. The rubber plug supply apparatus according to claim 4, wherein:
the orientation change device includes a hole that is capable of accommodating the rubber plug and is to be in communication with the accommodation hole, and
the accommodation assistance device drives the transportation device to move the position of the accommodation hole with respect to the hole at least between a position directly facing the hole and a position that is shifted from the position directly facing the hole and faces a part of the hole.

6. The rubber plug supply apparatus according to claim 4, wherein:
the orientation change device includes:
a rotatable body including a hole that is capable of accommodating the rubber plug and is to be in communication with the accommodation hole,
a rotation shaft extending in a direction perpendicular to an axial direction of the hole, and
a rotation driving portion rotating the rotatable body about the rotation shaft, and
the accommodation assistance device drives the rotation driving portion to move the position of the hole with respect to the accommodation hole at least between a position directly facing the accommodation hole and a position that is shifted from the position directly facing the accommodation hole and faces a part of the accommodation hole.

7. The rubber plug supply apparatus according to claim 4, wherein:
the orientation change device includes a hole that is capable of accommodating the rubber plug and is to be in communication with the accommodation hole, and
the rubber plug supply apparatus further includes an insertion device injecting air into the accommodation hole in a state where the accommodation hole and the hole are in communication with each other, to push the rubber plug into the hole.

8. The rubber plug supply apparatus according to claim 4, wherein:
the orientation change device includes a hole that is capable of accommodating the rubber plug and is to be in communication with the accommodation hole, and
the rubber plug supply apparatus further includes an insertion device including:
a pressing body contacting the rubber plug in a state where the accommodation hole and the hole are in communication with each other, and
a first actuator moving the pressing body, and the insertion device drives the first actuator to press the rubber plug with the pressing body, and thus to push the rubber plug into the hole.

9. The rubber plug supply apparatus according to claim 4, wherein:
the orientation change device includes:
a rotatable body including a hole that is capable of accommodating the rubber plug and is to be in communication with the accommodation hole,
a rotation shaft extending in a direction perpendicular to an axial direction of the hole, and
a rotation driving portion rotating the rotatable body about the rotation shaft,
the orientation change device drives the rotation driving portion to rotate the rotatable body about the rotation shaft, and thus to change the orientation of the rubber plug, the hole includes a small portion having a cross-section smaller than that of a maximum outer shape of the rubber plug as seen in the axial direction of the hole, the dispatch device dispatches the rubber plug from the hole at least in the case where the orientation of the rubber plug is changed by the orientation change device, and the small portion stops the rubber plug, inserted into the hole, at a central portion of the hole in the axial direction thereof, and, while the rubber plug is dispatched from the hole by the dispatch device, allows the rubber plug to pass therethrough in a deformed state.

10. The rubber plug supply apparatus according to claim 4, wherein:

the orientation change device includes:
  a rotatable body including a hole that is capable of accommodating the rubber plug and is to be in communication with the accommodation hole,
  a rotation shaft extending in a direction perpendicular to an axial direction of the hole, and
  a rotation driving portion rotating the rotatable body about the rotation shaft, the orientation change device drives the rotation driving portion to rotate the rotatable body about the rotation shaft, and thus to change the orientation of the rubber plug, the rubber plug supply apparatus further includes a stopper device including:
  a stopper inserted into the hole in a state where the hole is in communication with the accommodation hole, and
  a second actuator inserting the stopper into the hole and separating the stopper from the hole, and the stopper, in a state of being inserted into the hole, stops the rubber plug, inserted into the hole, at a central portion of the hole in the axial direction thereof.

11. The rubber plug supply apparatus according to claim 4, wherein:

the orientation change device includes a hole that is capable of accommodating the rubber plug and is to be in communication with the accommodation hole, and the dispatch device includes:
  a dispatch path, in communication with the hole, through which the rubber plug passes,
  a first injection portion connected with the hole, the first injection portion injecting air in a dispatch direction of the rubber plug, and
  a second injection portion provided at the dispatch path, the second injection portion injecting air in the dispatch direction of the rubber plug.

12. The rubber plug supply apparatus according to claim 1, wherein:

the orientation change device includes:
  a rotatable body including the accommodation hole,
  a rotation shaft extending in a direction perpendicular to an axial direction of the accommodation hole, and
  a rotation driving portion rotating the rotatable body about the rotation shaft, and the accommodation assistance device drives the rotation driving portion to move the position of the accommodation hole with respect to the discharge port between the first position and the second portion.

13. The rubber plug supply apparatus according to claim 12, wherein:

the accommodation hole includes a small portion having a cross-section smaller than that of a maximum outer shape of the rubber plug as seen in the axial direction of the accommodation hole, the dispatch device dispatches the rubber plug from the accommodation hole, and the small portion stops the rubber plug, inserted into the accommodation hole, at a central portion of the accommodation hole in the axial direction thereof, and, while the rubber plug is dispatched from the accommodation hole by the dispatch device, allows the rubber plug to pass therethrough in a deformed state.

14. The rubber plug supply apparatus according to claim 12, further comprising a stopper device including:

a stopper insertable into the accommodation hole at least in a state where the accommodation hole is at the first position with respect to the discharge port, and a second actuator inserting the stopper into the accommodation hole and separating the stopper from the accommodation hole, and wherein the stopper, in a state of being inserted into the accommodation hole, stops the rubber plug, inserted into the accommodation hole, at a central portion of the accommodation hole in the axial direction thereof.

15. The rubber plug supply apparatus according to claim 12, wherein the dispatch device includes:

a dispatch path, in communication with the accommodation hole, through which the rubber plug passes, a first injection portion connected with the accommodation hole, the first injection portion injecting air in the dispatch direction of the rubber plug, and a second injection portion connected with the dispatch path, the second injection portion injecting air in the dispatch direction of the rubber plug.

16. The rubber plug supply apparatus according to claim 12, wherein:

the rotatable body is rotatable among a first rotation position at which the accommodation hole directly faces the discharge port, a second rotation position at which the accommodation hole is connected with the dispatch device, and a third rotation position beyond the second rotation position as seen from the first rotation position, the rotatable body includes another accommodation hole directly facing the discharge port in a state where the rotatable body is at the second rotation position, and the accommodation assistance device drives the rotation driving portion to rotate the rotatable body from the first rotation position to the third rotation position and further from the third rotation position to the second rotation position.

17. The rubber plug supply apparatus according to claim 1, wherein:

the supply device includes an air supply portion connected with the accommodation portion, the air supply portion sending air to the accommodation portion, and the supply path has a tubular shape including one opening or a plurality of openings formed in a side surface thereof.

18. The rubber plug supply apparatus according to claim 17, wherein the one opening or the plurality of openings include an opening formed in a portion closer to the discharge port than a middle portion of the supply path.

19. The rubber plug supply apparatus according to claim 17, wherein:

the discharge port is formed at one end among two ends of the supply path, and the one opening or the plurality of openings include an opening formed so as to reach the one end.

* * * * *